United States Patent
Li

(10) Patent No.: US 10,747,673 B2
(45) Date of Patent: Aug. 18, 2020

(54) SYSTEM AND METHOD FOR FACILITATING CLUSTER-LEVEL CACHE AND MEMORY SPACE

(71) Applicant: Alibaba Group Holding Limited, George Town, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/180,919

(22) Filed: Nov. 5, 2018

(65) Prior Publication Data

US 2020/0042454 A1 Feb. 6, 2020

Related U.S. Application Data

(60) Provisional application No. 62/713,920, filed on Aug. 2, 2018.

(51) Int. Cl.
*G06F 12/00* (2006.01)
*G06F 12/0871* (2016.01)
(Continued)

(52) U.S. Cl.
CPC ........ *G06F 12/0871* (2013.01); *G06F 9/5016* (2013.01); *G06F 11/1464* (2013.01);
(Continued)

(58) Field of Classification Search
CPC ............ G06F 12/0871; G06F 12/0246; G06F 12/0813; G06F 12/0868; G06F 9/5016;
(Continued)

(56) References Cited

U.S. PATENT DOCUMENTS 4,775,932 A 10/1988 Oxley
6,148,377 A * 11/2000 Carter .................. G06F 9/5016
711/147
(Continued)

FOREIGN PATENT DOCUMENTS

JP 2003022209 1/2003
JP 2011175422 9/2011
(Continued)

OTHER PUBLICATIONS https://web.archive.org/web/20071130235034/http://en.wikipedia.org:80/wiki/ logical_block_addressing wikipedia screen shot retriefed on wayback Nov. 20, 2007 showing both physical and logical addressing used historically to access data on storage devices (Year: 2007).

(Continued)

*Primary Examiner* — Shawn X Gu
(74) *Attorney, Agent, or Firm* — Shun Yao; Park, Vaughan, Fleming & Dowler LLP

(57) ABSTRACT

Embodiments described herein provide a system for facilitating cluster-level cache and memory in a cluster. During operation, the system presents a cluster cache and a cluster memory to a first application running on a first compute node in the cluster. The system maintains a first mapping between a first virtual address of the cluster cache and a first physical address of a first persistent storage of the first compute node. The system maintains a second mapping between a second virtual address of the cluster memory and a second physical address of a second persistent storage of a first storage node of the cluster. Upon receiving a first memory allocation request for cache memory from the first application, the system allocates a first memory location corresponding to the first physical address. The first appli-
(Continued)

cation can be configured to access the first memory location based on the first virtual address.

20 Claims, 14 Drawing Sheets

(51) Int. Cl.
G06F 12/0868 (2016.01)
G06F 12/0813 (2016.01)
H04L 29/08 (2006.01)
G06F 9/50 (2006.01)
G06F 11/14 (2006.01)
G06F 12/02 (2006.01)

(52) U.S. Cl.
CPC ...... *G06F 12/0246* (2013.01); *G06F 12/0813* (2013.01); *G06F 12/0868* (2013.01); *H04L 67/2842* (2013.01); *G06F 2212/314* (2013.01); *G06F 2212/403* (2013.01); *G06F 2212/657* (2013.01); *G06F 2212/7201* (2013.01)

(58) Field of Classification Search
CPC ............. G06F 11/1464; G06F 67/2842; G06F 2212/314; G06F 2212/403; G06F 2212/657; G06F 2212/7201
See application file for complete search history.

(56) References Cited

U.S. PATENT DOCUMENTS

| | | | |
|---|---|---|---|
| 6,226,650 | B1 | 5/2001 | Mahajan et al. |
| 7,565,454 | B2 | 7/2009 | Zuberi |
| 8,260,924 | B2 | 9/2012 | Koretz |
| 8,452,819 | B1 | 5/2013 | Sorenson, III |
| 8,516,284 | B2 | 8/2013 | Chan |
| 8,751,763 | B1 | 6/2014 | Ramarao |
| 8,825,937 | B2 | 9/2014 | Atkisson |
| 9,043,545 | B2 | 5/2015 | Kimmel |
| 9,088,300 | B1 | 7/2015 | Chen |
| 9,092,223 | B1 | 7/2015 | Pani |
| 9,280,472 | B1 | 3/2016 | Dang |
| 9,280,487 | B2 | 3/2016 | Candelaria |
| 9,529,601 | B1 | 12/2016 | Dharmadhikari |
| 9,588,698 | B1 | 3/2017 | Karamcheti |
| 9,588,977 | B1 | 3/2017 | Wang |
| 10,013,169 | B2 | 7/2018 | Fisher |
| 10,235,198 | B2 | 3/2019 | Qiu |
| 2002/0010783 | A1 | 1/2002 | Primak |
| 2002/0073358 | A1 | 6/2002 | Atkinson |
| 2002/0161890 | A1 | 10/2002 | Chen |
| 2003/0163594 | A1 | 8/2003 | Aasheim |
| 2003/0163633 | A1 | 8/2003 | Aasheim |
| 2004/0010545 | A1 | 1/2004 | Pandya |
| 2004/0255171 | A1 | 12/2004 | Zimmer |
| 2004/0268278 | A1 | 12/2004 | Hoberman |
| 2005/0038954 | A1 | 2/2005 | Saliba |
| 2005/0097126 | A1 | 5/2005 | Cabrera |
| 2005/0177755 | A1 | 8/2005 | Fung |
| 2005/0195635 | A1 | 9/2005 | Conley |
| 2005/0235067 | A1 | 10/2005 | Creta |
| 2005/0235171 | A1 | 10/2005 | Igari |
| 2006/0156012 | A1 | 7/2006 | Beeson |
| 2007/0033323 | A1 | 2/2007 | Gorobets |
| 2007/0101096 | A1 | 5/2007 | Gorobets |
| 2008/0034154 | A1 | 2/2008 | Lee |
| 2009/0113219 | A1 | 4/2009 | Aharonov |
| 2009/0282275 | A1 | 11/2009 | Yermalayeu |
| 2009/0307249 | A1 | 12/2009 | Koifman |
| 2009/0310412 | A1 | 12/2009 | Jang |
| 2010/0169470 | A1 | 7/2010 | Takashige |
| 2010/0229224 | A1 | 9/2010 | Etchegoyen |
| 2010/0325367 | A1 | 12/2010 | Kornegay |
| 2011/0055458 | A1 | 3/2011 | Kuehne |
| 2011/0055471 | A1 | 3/2011 | Thatcher |
| 2011/0099418 | A1 | 4/2011 | Chen |
| 2011/0153903 | A1 | 6/2011 | Hinkle |
| 2011/0161784 | A1 | 6/2011 | Selinger |
| 2011/0218969 | A1 | 9/2011 | Anglin |
| 2011/0231598 | A1 | 9/2011 | Hatsuda |
| 2011/0292538 | A1 | 12/2011 | Haga |
| 2011/0302353 | A1 | 12/2011 | Confalonieri |
| 2012/0084523 | A1 | 4/2012 | Littlefield |
| 2012/0117399 | A1 | 5/2012 | Chan |
| 2012/0147021 | A1 | 6/2012 | Cheng |
| 2012/0159289 | A1 | 6/2012 | Piccirillo |
| 2012/0210095 | A1 | 8/2012 | Nellans |
| 2012/0246392 | A1 | 9/2012 | Cheon |
| 2012/0278579 | A1 | 11/2012 | Goss |
| 2012/0284587 | A1 | 11/2012 | Yu |
| 2013/0061029 | A1 | 3/2013 | Huff |
| 2013/0073798 | A1 | 3/2013 | Kang |
| 2013/0080391 | A1 | 3/2013 | Raichstein |
| 2013/0145085 | A1 | 6/2013 | Yu |
| 2013/0145089 | A1 | 6/2013 | Eleftheriou |
| 2013/0151759 | A1 | 6/2013 | Shim |
| 2013/0159251 | A1 | 6/2013 | Skrenta |
| 2013/0166820 | A1 | 6/2013 | Batwara |
| 2013/0173845 | A1 | 7/2013 | Aslam |
| 2013/0219131 | A1 | 8/2013 | Alexandron |
| 2013/0318283 | A1 | 11/2013 | Small |
| 2014/0082273 | A1* | 3/2014 | Segev ............... G06F 11/1448 711/108 |
| 2014/0108414 | A1 | 4/2014 | Stillerman |
| 2014/0181532 | A1 | 6/2014 | Camp |
| 2014/0233950 | A1 | 8/2014 | Luo |
| 2014/0250259 | A1 | 9/2014 | Ke |
| 2014/0304452 | A1 | 10/2014 | De La Iglesia |
| 2014/0310574 | A1 | 10/2014 | Yu |
| 2014/0359229 | A1 | 12/2014 | Cota-Robles |
| 2014/0365707 | A1 | 12/2014 | Talagala |
| 2015/0019798 | A1 | 1/2015 | Huang |
| 2015/0082317 | A1 | 3/2015 | You |
| 2015/0106556 | A1 | 4/2015 | Yu |
| 2015/0106559 | A1 | 4/2015 | Cho |
| 2015/0142752 | A1 | 5/2015 | Chennamsetty |
| 2015/0227316 | A1 | 8/2015 | Warfield |
| 2015/0277937 | A1 | 10/2015 | Swanson |
| 2015/0301964 | A1 | 10/2015 | Brinicombe |
| 2015/0304108 | A1 | 10/2015 | Obukhov |
| 2015/0363271 | A1 | 12/2015 | Haustein |
| 2015/0372597 | A1 | 12/2015 | Luo |
| 2016/0014039 | A1 | 1/2016 | Reddy |
| 2016/0098344 | A1 | 4/2016 | Gorobets |
| 2016/0110254 | A1 | 4/2016 | Cronie |
| 2016/0232103 | A1 | 8/2016 | Schmisseur |
| 2016/0239074 | A1 | 8/2016 | Lee |
| 2016/0239380 | A1 | 8/2016 | Wideman |
| 2016/0274636 | A1 | 9/2016 | Kim |
| 2016/0306853 | A1 | 10/2016 | Sabaa |
| 2016/0343429 | A1 | 11/2016 | Nieuwejaar |
| 2016/0350002 | A1 | 12/2016 | Vergis |
| 2017/0075583 | A1 | 3/2017 | Alexander |
| 2017/0075594 | A1 | 3/2017 | Badam |
| 2017/0109232 | A1 | 4/2017 | Cha |
| 2017/0147499 | A1 | 5/2017 | Mohan |
| 2017/0162235 | A1 | 6/2017 | De |
| 2017/0168986 | A1 | 6/2017 | Sajeepa |
| 2017/0212708 | A1 | 7/2017 | Suhas |
| 2017/0228157 | A1 | 8/2017 | Yang |
| 2017/0249162 | A1 | 8/2017 | Tsirkin |
| 2017/0262178 | A1 | 9/2017 | Hashimoto |
| 2017/0285976 | A1 | 10/2017 | Durham |
| 2017/0286311 | A1 | 10/2017 | Juenemann |
| 2017/0344470 | A1 | 11/2017 | Yang |
| 2017/0344491 | A1 | 11/2017 | Pandurangan |
| 2017/0353576 | A1 | 12/2017 | Guim Bernat |
| 2018/0024772 | A1 | 1/2018 | Madraswala |
| 2018/0088867 | A1 | 3/2018 | Kaminaga |
| 2018/0107591 | A1 | 4/2018 | Smith |
| 2018/0143780 | A1 | 5/2018 | Cho |
| 2018/0167268 | A1 | 6/2018 | Liguori |
| 2018/0189182 | A1 | 7/2018 | Wang |

(56) References Cited

U.S. PATENT DOCUMENTS

| | | |
|---|---|---|
| 2018/0270110 A1 | 9/2018 | Chugtu |
| 2018/0329776 A1 | 11/2018 | Lai |
| 2018/0373428 A1 | 12/2018 | Kan |
| 2019/0012111 A1 | 1/2019 | Li |
| 2019/0073262 A1 | 3/2019 | Chen |
| 2019/0205206 A1 | 7/2019 | Hornung |

FOREIGN PATENT DOCUMENTS

| | | |
|---|---|---|
| WO | 9418634 | 8/1994 |
| WO | 1994018634 | 8/1994 |

OTHER PUBLICATIONS

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices" < FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

\* cited by examiner

SYSTEM AND METHOD FOR FACILITATING CLUSTER-LEVEL CACHE AND MEMORY SPACE

RELATED APPLICATION

This application claims the benefit of U.S. Provisional Application No. 62/713,920, titled "Method and System of Cluster-Level Cache-Memory Space Cooperating with Offline Storage to Accommodate the Mixed Deployment of Applications," by inventor Shu Li, filed 2 Aug. 2018, the disclosure of which is incorporated herein by reference in its entirety.

BACKGROUND

Field

This disclosure is generally related to the field of storage management. More specifically, this disclosure is related to a system and method for facilitating cluster-level memory space for applications (or apps) to run on.

Related Art

The exponential growth of the Internet has made it a popular delivery medium for a variety of applications running on physical and virtual devices. Such applications have brought with them an increasing demand for computing resources. As a result, equipment vendors race to build larger and faster computing equipments (e.g., processors, storage, memory devices, etc.) with versatile capabilities. However, the capability of a computing equipment cannot grow infinitely. It is limited by physical space, power consumption, and design complexity, to name a few factors. Furthermore, computing devices with higher capability are usually more complex and expensive. More importantly, because an overly large and complex system often does not provide economy of scale, simply increasing the size and capability of a computing device to accommodate higher computing demand may prove economically unviable.

On such a computing device, memory is conventionally used as the bridging layer that temporarily stores data. To pursue high performance, the applications running on a computing device typically maintain a significant amount of data in the memory for efficient access and frequent operations. When the computing on the data is complete, usually the data is transferred to a more persistent storage. However, with the development of distributed systems, the data consistency can be enforced through multiple layers of protections. As a result, some memory failure can be recovered using the distributed protection and, hence, could be tolerated. Furthermore, in a distributed computing infrastructure, such as cloud computing, an application can continuously run on the memory of the underlying computing resources without the need to transfer data to a persistent storage device. These features mitigate the persistent storage requirements of certain applications, such as database, search engines, etc. Therefore, the role of the memory has changed from temporary storage to a relatively consistent storage.

If an application can simply run on the underlying infrastructure without accounting for physical hardware resources and infrastructure software, the application can be designed to operate with high efficiency. Hence, the application developers can focus on the optimization of the application.

SUMMARY

Embodiments described herein provide a system for facilitating cluster-level cache and memory in a cluster. During operation, the system presents a cluster cache and a cluster memory to a first application running on a first compute node in the cluster. The cluster cache can be based on persistent storages of one or more compute nodes in the cluster, and the cluster memory can be based on persistent storages of one or more storage nodes in the cluster. The system can maintain a first mapping between a first virtual address of the cluster cache and a first physical address of a first persistent storage of the first compute node of the one or more compute nodes. Upon receiving a first memory allocation request for cache memory from the first application, the system allocates a first memory location corresponding to the first physical address based on the first mapping. The first application can be configured to access the first memory location based on the first virtual address.

In a variation on this embodiment, the system determines whether a second memory allocation request from the first application can be served from the first persistent storage. If the second memory allocation request cannot be served from the first persistent storage, the system allocates a second memory location corresponding to a third physical address of a third persistent storage of a second compute node of the one or more compute nodes. The third physical address is mapped to a third virtual address. The first application can be configured to access the second memory location based on the third virtual address.

In a variation on this embodiment, upon receiving a first free request from the first application based on the first virtual address, the system can make the first memory location available for subsequent allocation.

In a variation on this embodiment, the system further maintains a second mapping between a second virtual address of the cluster memory and a second physical address of a second persistent storage of a first storage node of the one or more storage nodes. In addition, the system stores a data page of the first application in a second memory location corresponding to the second physical address based on the second mapping. The first application is configured to access the second memory location based on the second virtual address.

In a further variation, the system stores a replica of the data page at a third memory location corresponding to the third physical address of a fourth persistent storage of a second storage node of the one or more storage nodes. The second virtual address is further mapped to the third physical address.

In a further variation, the system receives a read request for the data page based on the second virtual address, selects between the second and the third persistent storages for retrieving the data page to serve the read request, and obtains the data page from the selected persistent storage.

In a variation on this embodiment, the system receives a write request for a data page from the first application based on the second virtual address, determines that the data page already exists based on the second mapping, and updates the second mapping without executing a write operation.

In a variation on this embodiment, the system receives a write request for a data page from the first application, stores the data page at memory locations of a plurality of physical addresses, and maps a third virtual address to the plurality of physical addresses. The system then selects one of the plurality of physical addresses as a representative address of the data page for presenting the cluster memory.

In a variation on this embodiment, the system determines unique data pages of the cluster memory, generates a backup file comprising the unique data pages and corresponding mapping information, and sends the backup file to an offline drive distinct from the one or more storage nodes.

In a further variation, the system applies erasure coding to the unique data pages and terminates replication-based protection for the unique data pages.

BRIEF DESCRIPTION OF THE FIGURES

In the figures, like reference numerals refer to the same figure elements.

DETAILED DESCRIPTION

Figure 1A:
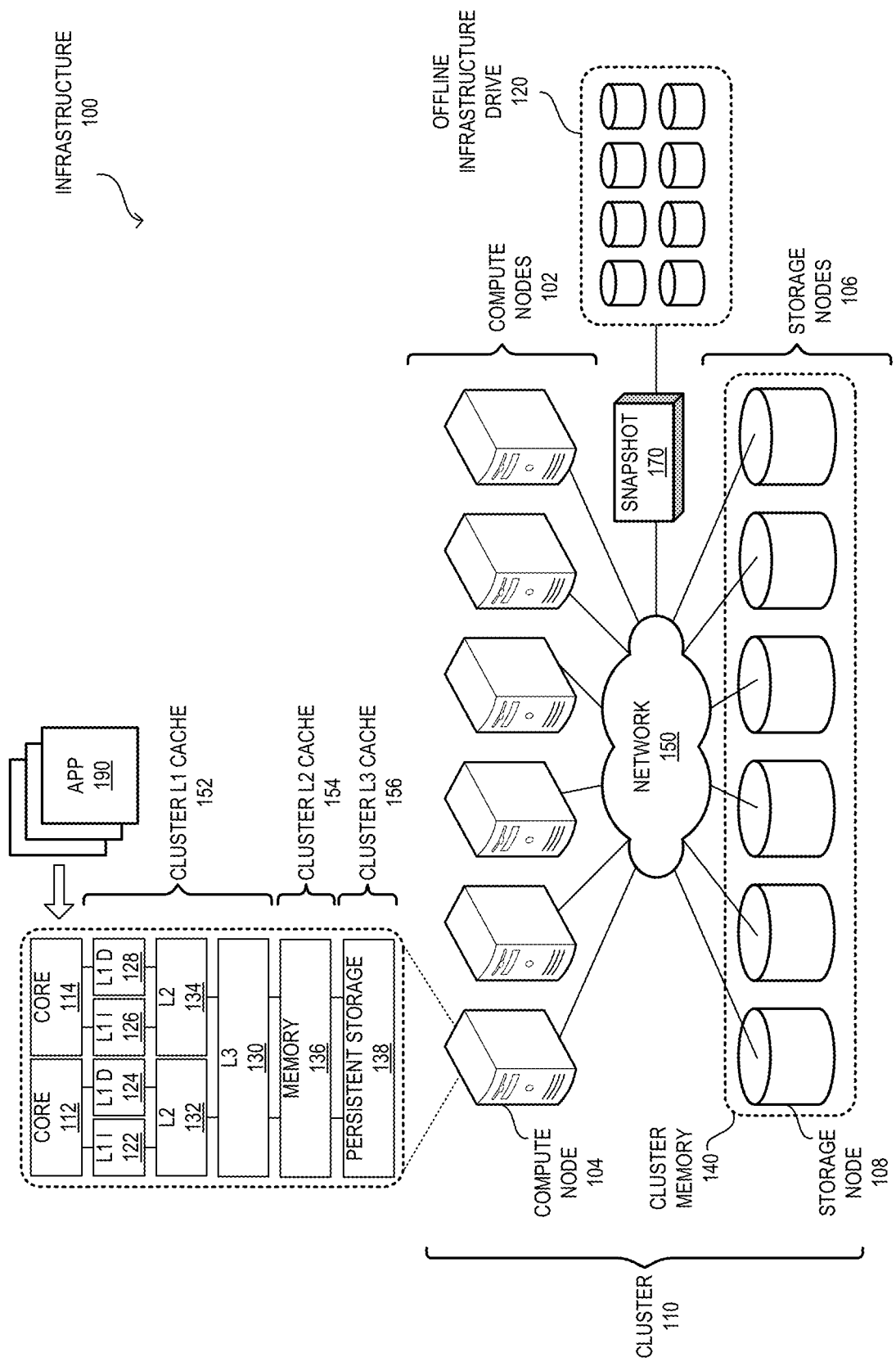
FIG. 1A illustrates an exemplary infrastructure that facilitates provision of cluster-level cache and memory to applications, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of providing large-scale cache and memory to applications without accounting for the underlying hardware and infrastructure software by providing the applications (i) a global cluster-cache represented by the local persistent storage devices of a respective compute node in a cluster; and (ii) a global cluster-memory represented by the persistent storage devices of a respective storage node in the cluster. The term "application" can refer to an application running on a device, which can issue an input/output (I/O) request (e.g., a read or a write request).

With existing technologies, in a cloud environment, applications typically run on virtual machines (VMs). A VM can provide an efficient and isolated replication of a physical machine. A VM can increase flexibility and efficiency during its deployment and execution. A VM can emulate a physical machine and run on a hypervisor. The hypervisor executes on the native hardware of the physical device, and facilitates sharing and management of the hardware. As a result, multiple VMs can execute on the same physical machine while remaining isolated from each other. A VM can also run as a process, which can be an application on a host operating system (OS). This VM is created when the process initiates and terminates when the process is terminated.

Regardless of its type, a VM still represents itself as a computer to the applications running on it using the virtual hardware configuration of the VM. However, this requires the application running on the VM to coordinate with the underlying hardware and/or system software to determine how to efficiently utilize the underlying VM configuration. For example, the configuration can indicate the hardware requirement of a particular VM and an application running on the VM may need to determine the efficiency of the application with respect to the underlying hardware and/or infrastructure software. Even though deployment of VMs in the cloud environment simplifies the execution space of the application, the strong coupling of the VM configuration and the underlying deployment with the hardware and infrastructure software may require the non-trivial resource and extends the development process. This can hinder the optimization of the applications running in a cloud environment.

To solve this problem, embodiments described herein provide an infrastructure that allows an application to run in a large memory space that can be byte-addressable. As a result, the application does not need to handle the block-level data access from persistent storage drives (e.g., a hard disk drive or HDD). The infrastructure can manage the data movement, storage, and retrieval in the background. Hence, when the application is launched on the infrastructure, a large-capacity virtual memory space becomes available to the application. Since the necessary memory needed to run the application can be allocated from the virtual memory space, the application can run on the virtual memory space without needing to manage data in persistent storage drives.

The application can simply use memory allocation and freeing up commands (e.g., a "malloc( )" or "free( )" call in a programming language) and the infrastructure can allocate or free up the memory from the virtual memory space. In this way, the application can free the unused memory space formerly allocated to the application and the underlying infrastructure can recycle the memory space (e.g., reallocate to another application). The infrastructure can include a set of compute nodes and a set of storage nodes. These nodes form a cluster of nodes. The compute nodes are responsible for executing the applications on the cluster. To facilitate the execution of an application on the cluster, the infrastructure forms a hierarchy of cluster lever 1 (L1) cache, level 2 (L2) cache, level 3 (L3) cache and a cluster memory. The cluster provides the space for the cluster memory, which is a byte-addressable memory space, that the applications use to hold data. In this way, the infrastructure provides processors, multiple levels of cluster cache, and the cluster memory to the application. As a result, the application can run on memory without needing to read from or write to a storage device based on block, file, object, etc.

The cluster L1 cache can include the L1/L2/L3 cache of a respective compute node's central processing unit (CPU). This cluster L1 cache can be dedicated to the local compute node and may not be shared with other compute nodes in the cluster. The cluster L2 cache is the memory (e.g., dynamic random-access memory (DRAM), such as dual in-line memory module (DIMM)), of the compute node. The cluster L2 cache can also be dedicated to the local compute node and may not be shared with other compute nodes in the cluster. However, the cluster L2 cache can be shared by the multiple CPU cores in the same compute node. The cluster L3 cache can be formed by the persistent storage devices, such as non-volatile memory (NVM) express (NVMe) solid-state drive (SSD), storage class memory (SCM), etc., in the compute nodes. However, the infrastructure can represent the combined storage of the cluster L3 cache as a byte-addressable cluster-level memory device accessible by a respective compute node.

The cluster can include one or more master nodes, which are responsible for managing cluster-level memory. Since the cluster L3 cache is a cluster-level logical memory space, the logical address of the cluster L3 cache can be contiguous and mapped to a physical memory location of the memory device of a compute node. Upon determining that a memory allocation is needed in the cluster L3 cache, the application can first attempt to allocate the memory from the local persistent storage device. If successful, the application can register with a master node, which in turn, maps a virtual address of the cluster L3 cache to the corresponding physical address of the storage device. The master node also notifies the application regarding the memory allocation and the virtual memory address. The application can store the data on the allocated memory space using the virtual address.

If the allocation in the local persistent storage is unsuccessful, the application can query the master node for the memory allocation. The master node can allocate the memory space from the persistent storage device of another compute node. The master node can select the persistent storage device of the other compute node based on one or more of: available memory space, load on the compute node, utilization, and the network bandwidth between the other compute node and the requesting compute node. The master node maps a virtual address of the cluster L3 cache to the corresponding physical address of the storage device of the other compute node. The master node also notifies the application regarding the memory allocation and the virtual memory address.

In some embodiments, the application can provide the request to a master node, which in turn, allocates the requested memory from the cluster L3 cache. In some embodiments, the master node can prioritize the allocation of memory from the cluster L3 cache. For example, the master node can allocate the logical space mapped to the memory of the local compute node to a high-priority application running on that compute node. The master node can also operate on a first-come, first-served basis. The master node can first map the local memory space in each individual compute node as the cluster L3 space used by the application running on the compute node. If the local memory space runs out, the master node can allocate cluster L3 memory space from the physical memory device of the other compute node. In this way, the master node maintains the virtual memory to the physical memory space mapping for the cluster L3 cache and can update the mapping according to the real-time memory allocation and free operations.

Furthermore, the infrastructure provides a cluster memory, which can be a virtual memory space, to a respective application running on the infrastructure. The infrastructure uses the storage space of the storage devices in a respective storage node to present the cluster memory. Each page in the cluster memory can be considered as a virtual page. The infrastructure can store multiple replicas of the virtual page in different storage nodes, thereby providing high availability to each virtual page. The infrastructure can maintain a mapping between the virtual memory address of the virtual page and the corresponding physical addresses of each replica. Hence, even though the application may consider the virtual page as a single page in the cluster memory, the data in the virtual page is stored in multiple physical pages. In this way, the infrastructure presents a virtualized cluster memory to the applications while maintaining multiple replicas.

In some embodiments, the infrastructure can record a snapshot of the content of the cluster memory and store the snapshot in an offline infrastructure drive. The offline drive can include another set of persistent storage drives that may not participate in the cluster memory. The offline drive can be co-located with the cluster or may be in a remote location accessible via a network. The content in the cluster cache may not be backed up in the offline drive. Since the offline drive is only used to store the backup data (i.e., the snapshots) instead of using the high-throughput low-latency drives, the offline device can include a low-cost hard disk drive as the high-capacity offline storage.

Exemplary Infrastructure

FIG. 1A illustrates an exemplary infrastructure that facilitates provision of cluster-level cache and memory to applications, in accordance with an embodiment of the present application. In this example, an infrastructure 100 can include a set of compute nodes 102 and a set of storage nodes 106. These nodes can be coupled to each other via a network 150 and form a cluster of nodes that can be referred to as cluster 110. Cluster 110 can facilitate a cloud environment (e.g., a datacenter) or an enterprise environment (e.g., a large entity). Compute nodes 102 are responsible for executing the applications on cluster 110. On the other hand, storage nodes 106 present a global cluster memory 140 represented by the persistent storage devices of a respective of one storage nodes 106.

Many applications that provide different cloud-based and/or network-based services run continuously. As a result, these applications may not need to consider intentionally shutting down, transferring application data to a persistent storage, and re-launching using the stored data. Hence, if infrastructure 100 can provide a large enough memory on which these applications can run without considering the underlying hardware or data transfer, these applications can be optimized to execute on the memory space. Infrastructure 100 provides such memory space using cluster memory 140. An application 190 can execute on CPU cores 112 and 114 of compute node 104 using the virtual memory space of cluster memory 140.

Cluster memory 140 can be a large memory space that can be byte-addressable. As a result, application 190 does not need to handle the block-level data access from persistent storage drives. Infrastructure 100 can manage the data movement, storage, and retrieval in the background. Hence, when application 190 is launched on infrastructure 100, cluster memory 140 is presented as a large-capacity virtual memory space to application 190. Since the necessary memory needed to run application 190 can be allocated from cluster memory 140, application 190 can run on the virtual memory space without the need to manage data in the persistent storage drives in storage nodes 106. Application 190 can simply use memory allocation commands and infrastructure 100 can allocate the memory from cluster memory 140.

For example, if application 190 requests memory allocation from cluster memory 140, infrastructure 100 can allocate the memory from storage node 108 of cluster 110. Application 190 may not be aware of the physical location of the allocated memory. To application 190, the allocated memory would be from the virtual memory space corresponding to cluster memory 140. In this way, cluster 110 provides a byte-addressable memory space application 190 that can be used for holding data. Similarly, application 190 can free the unused memory space formerly allocated to application 190 and infrastructure 100 can recycle the memory space.

To facilitate the execution of application 190 on cluster 110, infrastructure 100 forms a hierarchy of cluster L1 cache 152, L2 cache 154, and L3 cache 156. Cluster L1 cache 152 can include L1/L2/L3 cache of a respective compute node's central processing unit (CPU). For example, on compute node 104, cluster L1 cache 152 can include L1 instruction cache 122 and data cache 124, and L2 cache 132 associated with CPU core 112, and L1 instruction cache 126 and data cache 128, and L2 cache 134 associated with CPU core 114. Cache 152 can also include L3 cache 130 associated with CPU cores 112 and 114. Cluster L2 cache 154 can be memory 136 of compute node 104. Cache 154 can be dedicated to compute node 104 and may not be shared with other compute nodes in cluster 110. However, cache 154 can be shared by CPU cores 112 and 114. Cluster L3 cache 156 can be formed by the persistent storage device 138, such as an SSD or an SCM, in compute node 104. Infrastructure 100 can represent the combined storage of cluster L3 cache 156 as a byte-addressable cluster-level memory accessible by a respective compute node in cluster 110.

In some embodiments, infrastructure 100 can record a snapshot 170 of the content of cluster memory 140 and store snapshot 170 in an offline infrastructure drive 120. Offline drive 120 can include a set of persistent storage drives that may not participate in cluster memory 140. Offline drive 120 can be co-located with cluster 110 or may be at a remote location accessible via network 150. The content in cluster L1/L2/L3 cache may not be backed up to offline drive 120. Since offline drive 120 is only used to store the backup data (e.g., snapshot 170), instead of using the high-throughput low-latency drives, offline device 120 can include one or more low-cost hard disk drives as the high-capacity offline storage.

Figure 1B:
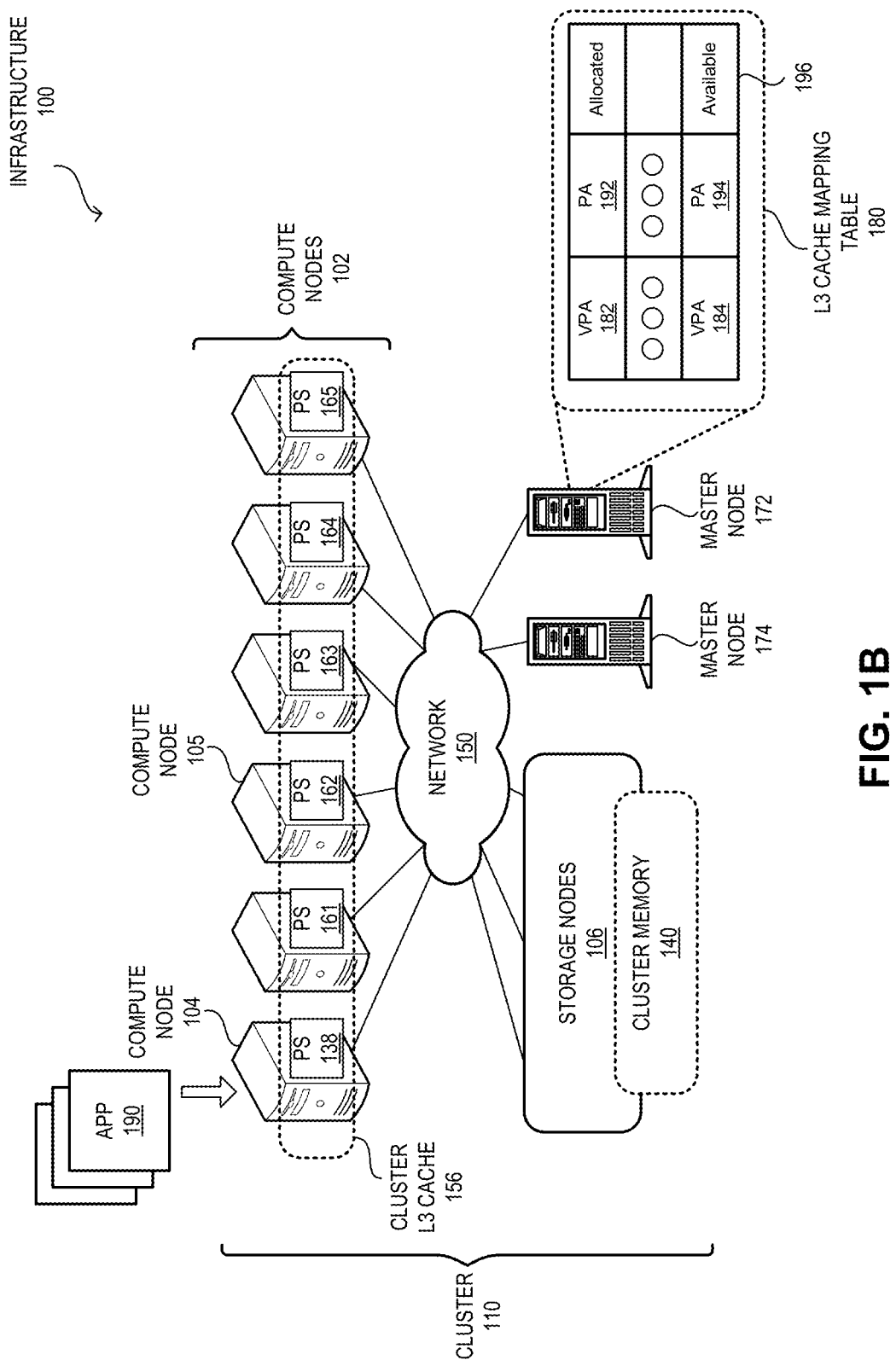
FIG. 1B illustrates exemplary cluster-level cache and memory, in accordance with an embodiment of the present application.

Even though cluster L3 cache 156 and cluster memory 140 are offered to application 190 as a contiguous virtual memory space, the corresponding physical memory devices are distributed across multiple devices. For example, persistent storage device 138 of compute node 104 only provides a portion of cache 156. Therefore, infrastructure 100 includes one or more master nodes that facilitate provision of cluster-level L3 cache 156 and memory 140. FIG. 1B illustrates exemplary cluster-level cache and memory, in accordance with an embodiment of the present application. Here, cluster 110 can include one or more master nodes 172 and 174, which are responsible for managing cluster-level cache 156 and memory 140.

Infrastructure 100 can present the persistent stores 138, 161, 162, 163, 164, and 165 of compute nodes 102 as a contiguous cluster L3 cache 156. Since cache 156 is a cluster-level logical memory space, a respective logical address (e.g., a byte address) of cache 156 can be contiguous (e.g., can be byte-incremental) and mapped to a physical memory location of the persistent storage of a compute node. For example, a logical address, such as a virtual page address 182, of cache 156 can be mapped to a corresponding physical page address 192, which can reside in persistent storage device 138 of compute node 104. In some embodiments, page address 192 can include an identifier of compute node 104 (e.g., a media access control (MAC) address, an Internet Protocol (IP) address, a cluster identifier that identifies compute node 104 in cluster 110, etc.). In this way, a respective page address in cluster 110 can uniquely identify a respective physical page on any of compute nodes 102.

Similarly, another virtual page address 184 of cache 156 can be mapped to a corresponding physical page address 194, which can reside in persistent storage device 162 of compute node 105. In cache 156, addresses 182 and 184 can appear as continuous byte addresses even though their corresponding physical location can be on different persistent storage devices. To facilitate the allocation of memory space from cache 156, master node 172 can maintain an L3 cache mapping table 180, which maps virtual page addresses 182 and 184 to physical page addresses 192 and 194, respectively. It should be noted that the identifier of a compute node can appear as a separate column in table 180 or as an embedded part of a page address. Each entry of table 180 can also include an indicator 196 (e.g., a flag) that indicates whether a particular virtual page has been allocated or is available.

Upon receiving a memory allocation request from cache 156 from application 190, compute node 104 can allocate memory from persistent storage device 138 and registers the allocated memory with master node 172. Master node 172 can map the physical address of the allocated memory space on persistent storage device 138 to a corresponding virtual address of cache 156 in table 180. If the memory allocation from persistent storage device 138 is unsuccessful, compute node 104 can query master node 172 for the memory allocation. Master node 172 can then allocate the requested memory from another persistent storage device, such as persistent storage device 161. Master node 172 can then map the physical address of the allocated memory space on persistent storage device 161 to a corresponding virtual address of cache 156 in table 180.

Alternatively, compute node 104 can provide the request to master node 172. Since application 190 runs on compute node 104, master node 172 can look up in table 180 to determine available virtual memory space in cache 156 that has been mapped to persistent storage 138. If master node 172 finds available virtual memory space, master node 172 can allocate that available space to application 190 and mark the indicator in the corresponding entry as "allocated." In this way, master node 172 facilitates allocation of memory in infrastructure 100. In some embodiments, one of master nodes 172 and 174 operates as an active node while the other operates as a standby node. Suppose that master node 172 operates as the active master node and master node 174 operates as the standby node. Any update in the mappings and states maintained by master nodes 172 and 174 can be synchronized. For example, master nodes 172 and 174 can maintain a copy of table 180. If master node 172 updates table 180, master node 172 can send a control message to master node 174 comprising the update. This allows master node 174 to maintain a synchronized copy of table 180. In this way, standby master node 174 can readily provide high availability if active master node 172 becomes unavailable.

Figure 2:
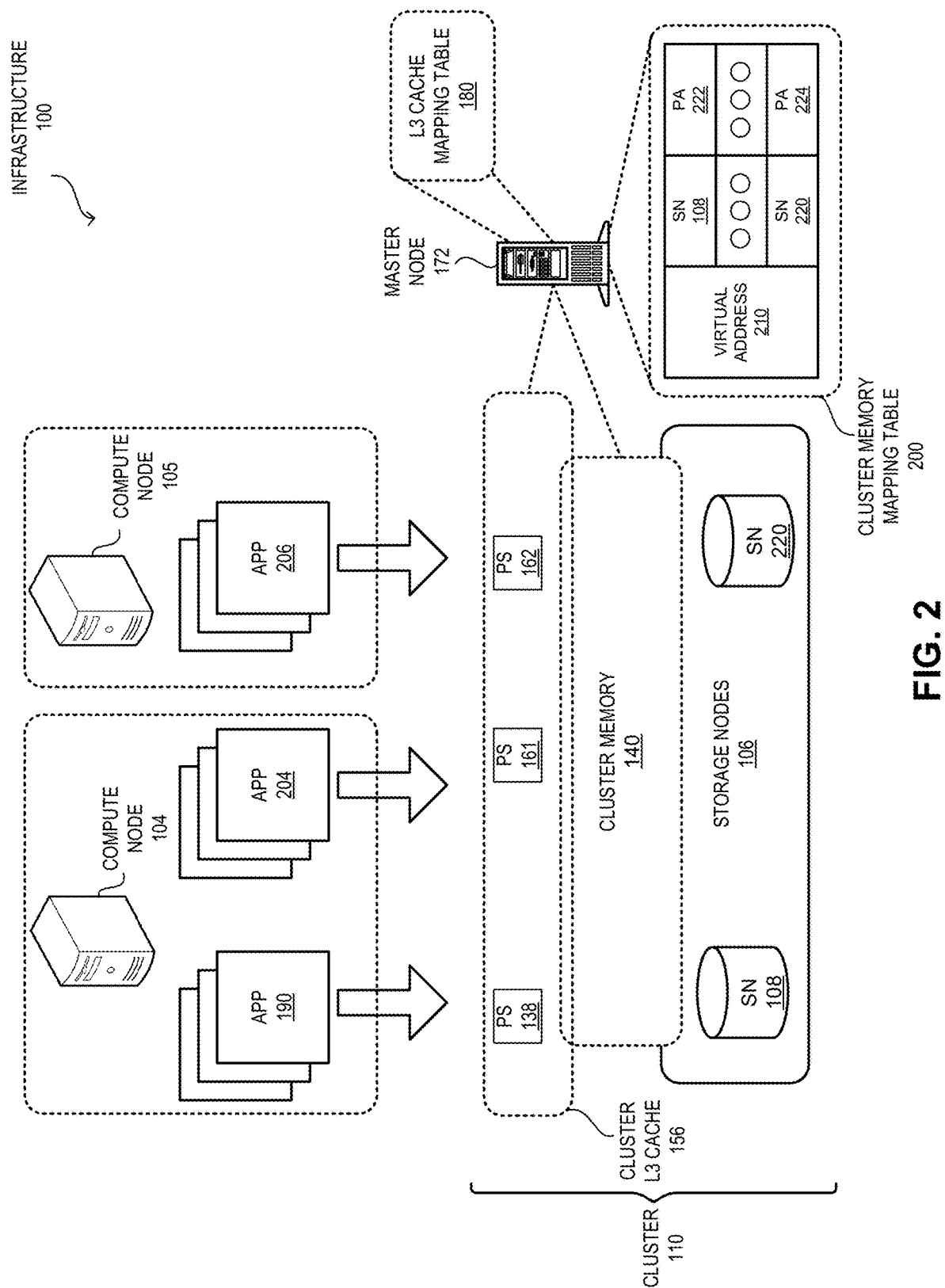
FIG. 2 illustrates an exemplary execution of applications on cluster-level cache and memory, in accordance with an embodiment of the present application.

FIG. 2 illustrates an exemplary execution of applications on cluster-level cache and memory, in accordance with an embodiment of the present application. To ensure efficient allocation of memory from cache 156, master node 172 can prioritize the allocation of memory from cache 156. For example, if application 190 is a high-priority application, for a request from application 190, master node 172 can allocate logical memory space mapped to the memory of persistent storage device 138 of compute node 104. On the other hand, for a low-priority application 204 running on the same compute node 104, master node 172 can allocate memory from another persistent storage device 161. Similarly, if application 206 is a high-priority application running on compute node 105, for a request from application 206, master node 172 can allocate logical memory space mapped to the memory of persistent storage device 162 of compute node 105.

Master node 172 can also operate on a first-come, first-served basis. Master node 172 can first map the local memory space in each individual compute node. For example, if application 190 first requests memory space from cache 156, master node 172 can allocate virtual memory space corresponding to persistent storage device 138. However, if available space runs out on persistent storage device 138, subsequent memory allocation requests from the same application 190 or another application 204 can be served from another persistent storage device 161. Upon allocating the memory from cache 156, master node 172 can update the L3 cache mapping table accordingly. In this way, master node 172 maintains the virtual memory to the physical memory space mapping for the cache 156 and can update the mapping based on the real-time memory allocation and free operations.

In addition, infrastructure 100 provides cluster memory 140 to applications 190, 204, and 206. Infrastructure 100 uses the storage space of the storage devices in storage nodes 106 to present cluster memory 140. For example, cluster memory 140 can include the storage space of the storage devices of storage nodes 108 and 220. Each page in cluster memory 140 can be considered as a virtual page. Infrastructure 100 can store multiple replicas of the virtual page in different storage nodes, thereby providing high availability to each virtual page. Infrastructure 100 can maintain a cluster memory mapping table 200, which maps a respective virtual memory address of the virtual page to the corresponding physical addresses of each replica. Master node 172 can store table 200, which can be accessible from each of storage nodes 106.

Suppose that the virtual page corresponding to a virtual address 210 is replicated in physical address 222 of storage node 108 and physical address 224 of storage node 220. Table 200 can map virtual address 210 to physical addresses 222 and 224. In some embodiments, table 200 can include a column representing the storage nodes as well. Table 200 can then map virtual address 210 to a tuple comprising an identifier of storage node 108 and physical address 222 on storage node 108. Table 200 can also map virtual address 210 to another tuple comprising an identifier of storage node 220 and physical address 224 on storage node 108. This allows a storage node to uniquely identify a respective physical address in cluster 110. Hence, even though application 190, 204, or 206 may consider virtual page corresponding to address 210 as a single page in cluster memory 140, the data in the virtual page is stored in physical pages corresponding to addresses 222 and 224 in storage nodes 108 and 220, respectively. In this way, infrastructure 100 presents the same virtualized cluster memory 140 to applications 190, 204, and 206 running on different compute nodes while maintaining multiple replicas of each virtual page on different storage nodes.

Operations of Cluster L3 Cache

Figure 3A:
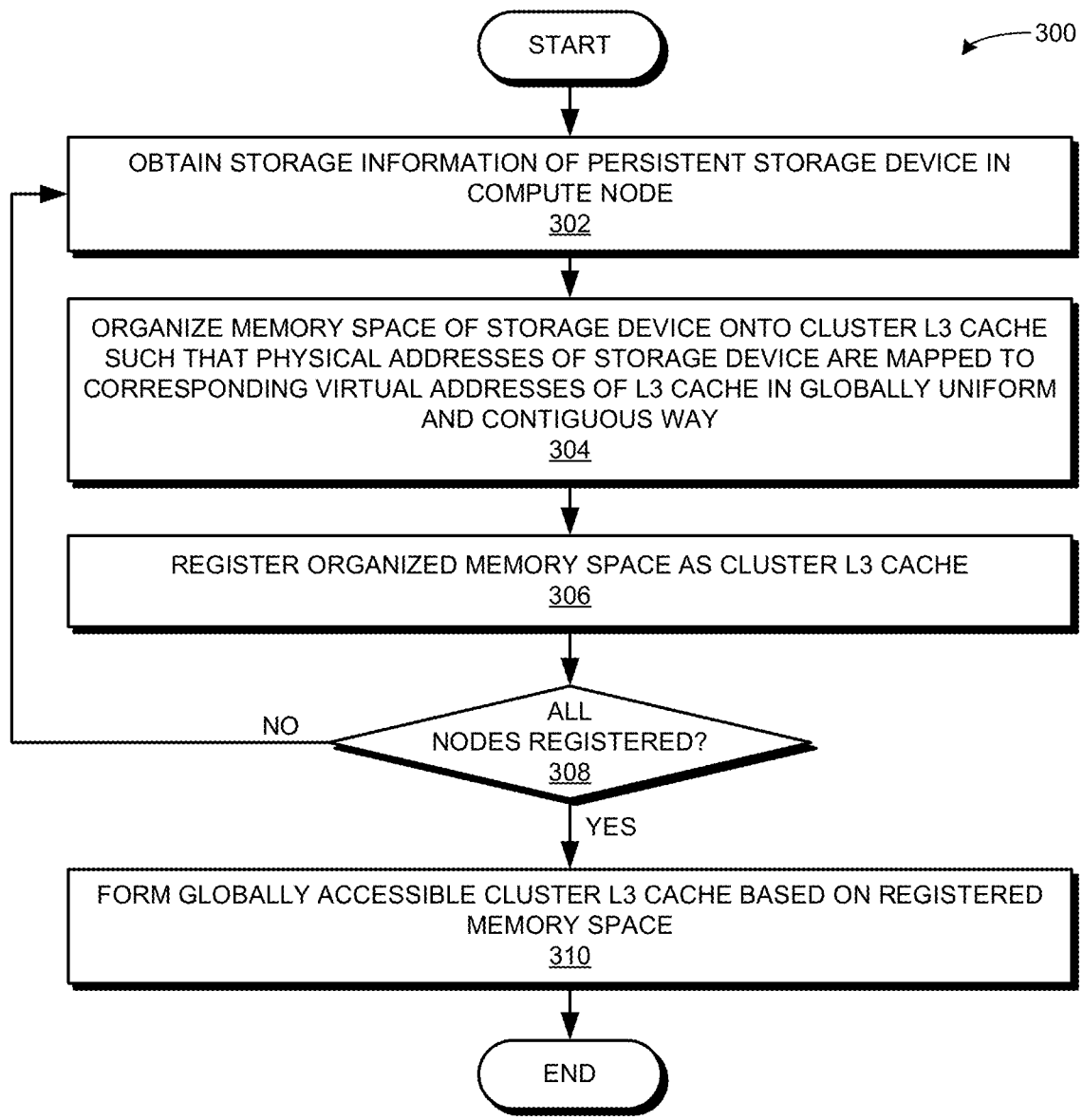
FIG. 3A presents a flowchart illustrating a method of a master node forming cluster layer-3 (L3) cache, in accordance with an embodiment of the present application.

FIG. 3A presents a flowchart 300 illustrating a method of a master node forming cluster L3 cache, in accordance with an embodiment of the present application. During operation, the master node obtains storage information of the persistent storage device(s) of a respective compute node (operation 302). The master node then organizes the memory space of the storage device onto cluster L3 cache such that the physical addresses of the storage device are mapped to the corresponding virtual addresses of the L3 cache in a globally uniform and contiguous way (operation 304). The master node then registers the organized memory space as the cluster L3 cache (operation 306) and checks whether all compute nodes have been registered (operation 308). If all compute nodes have not been registered, the master node continues to obtain storage information of the persistent storage device(s) of the next compute node (operation 302). Upon registering all compute nodes, the master node can form the globally accessible cluster L3 cache based on the registered memory space (operation 310).

Figure 3B:
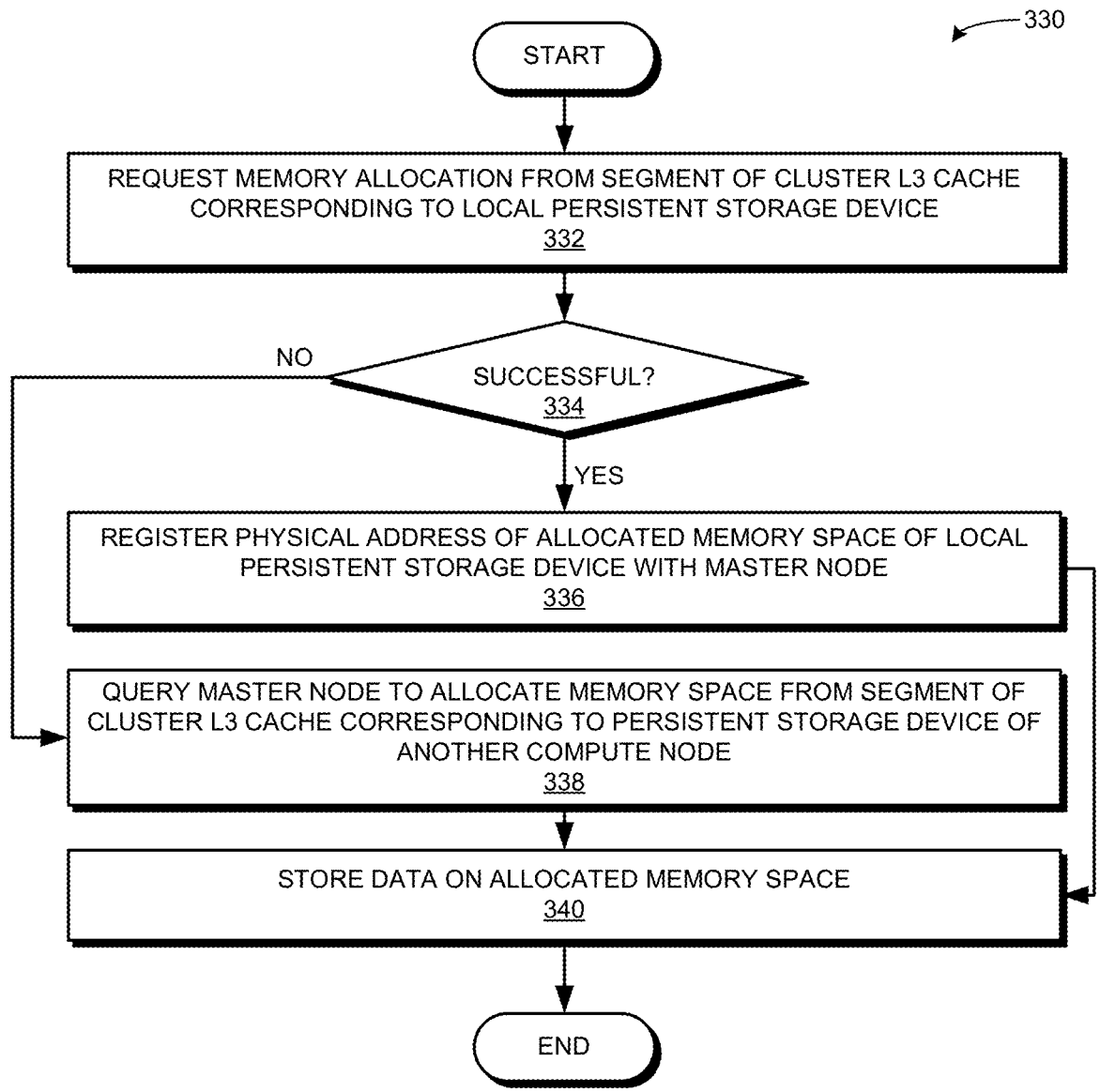
FIG. 3B presents a flowchart illustrating a method of an application requesting memory allocation in the cluster L3 cache, in accordance with an embodiment of the present application.

FIG. 3B presents a flowchart 330 illustrating a method of an application requesting memory allocation in the cluster L3 cache, in accordance with an embodiment of the present application. During operation, the application requests memory allocation from the segment of the cluster L3 cache corresponding to the local persistent storage device (operation 332) and checks whether the memory allocation is successful (operation 334). If successful, the application registers the physical address of the allocated memory space of the local persistent storage device with a master node (operation 336). Upon successful memory allocation, the application can know the physical address of the allocated memory space.

In some embodiments, the application can send a control message to the master node for the registration. The control message can indicate it's a registration request and include the physical address of the allocated memory space. On the other hand, if unsuccessful, the application queries the master node to allocate memory space from the segment of the cluster L3 cache corresponding to the local persistent storage device of another compute node (operation 338). The query can also be based on a control message that indicates it's a memory allocation request and includes the memory allocation request. This causes the master node to allocate the requested memory. When the memory has been allocated (operation 336 or 338), the application can store data on the allocated memory space (operation 340).

Figure 3C:
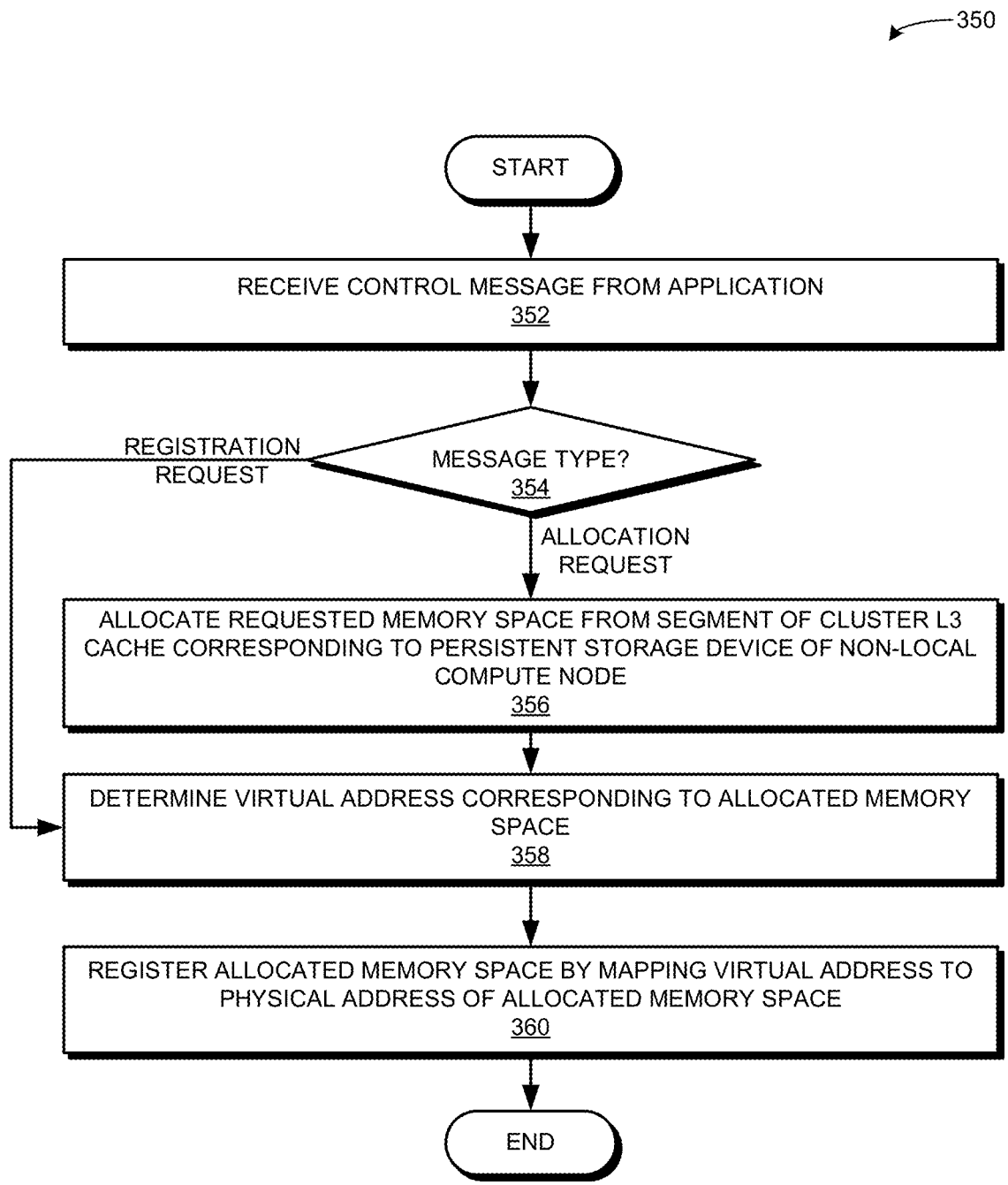
FIG. 3C presents a flowchart illustrating a method of a master node registering memory allocated on the cluster L3 cache, in accordance with an embodiment of the present application.

FIG. 3C presents a flowchart 350 illustrating a method of a master node registering memory allocated on the cluster L3 cache, in accordance with an embodiment of the present application. During operation, the master node receives a control message from an application (operation 352) and determines the message type (operation 354). If the message type is a memory allocation request, the master node allocates the requested memory space from the segment of the cluster L3 cache corresponding to the persistent storage device of a non-local (e.g., a different) compute node (operation 356). If the message type is a registration request (operation 354) or upon the memory allocation (operation 356), the master node determines the virtual address corresponding to the allocated memory space (operation 358). The master node registers the allocated memory space by mapping the virtual address to the physical address of the allocated memory space (operation 360).

Figure 3D:
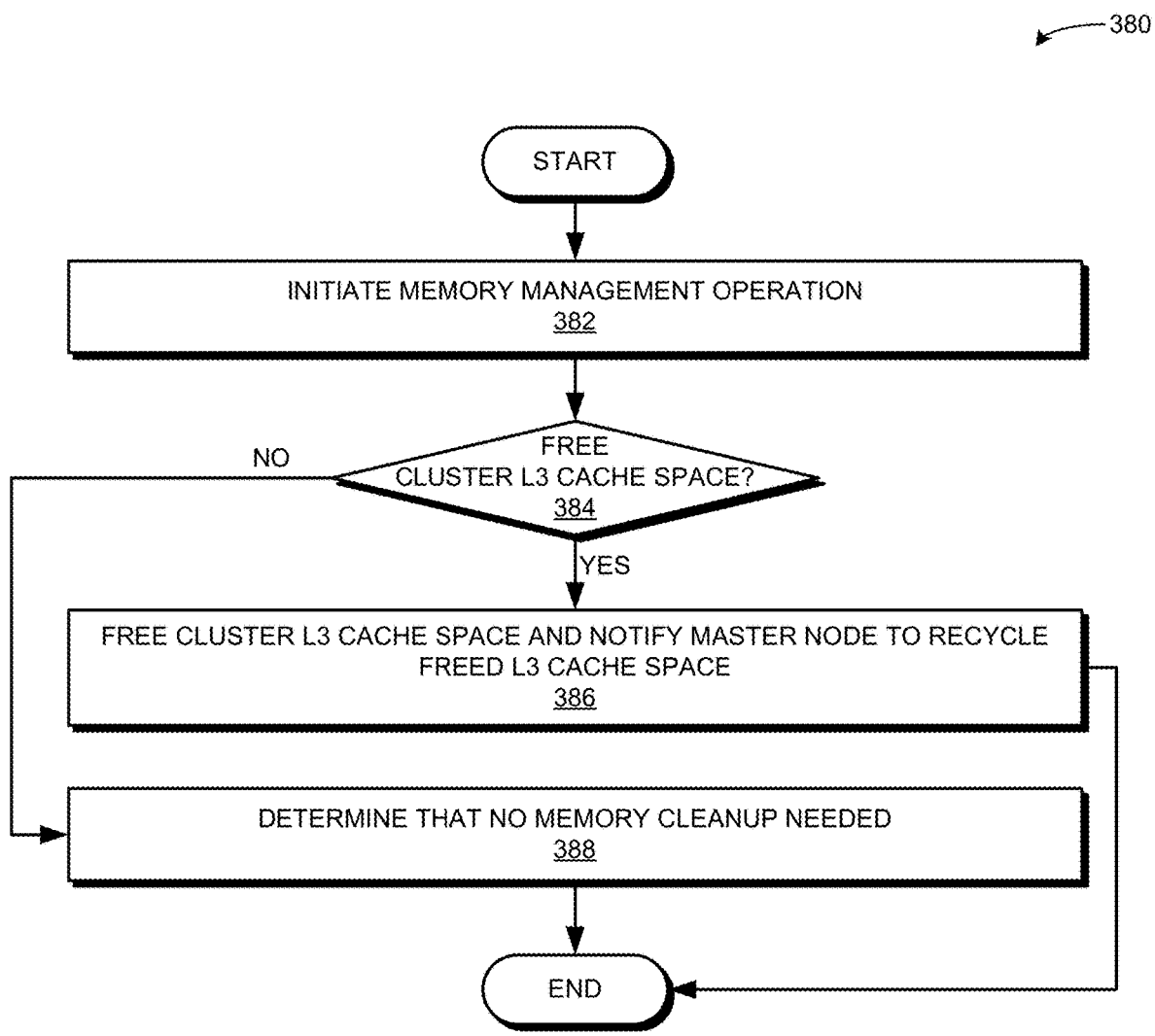
FIG. 3D presents a flowchart illustrating a method of an application performing memory management on the cluster L3 cache, in accordance with an embodiment of the present application.

FIG. 3D presents a flowchart 380 illustrating a method of an application performing memory management on the cluster L3 cache, in accordance with an embodiment of the present application. During operation, the master node initiates a memory management operation (operation 382) (e.g., a "garbage collection" call) and checks whether it needs to free cluster L3 cache space (operation 384). The memory management operation can be initiated based on a memory call, such as a garbage collection call from the application. If a free operation is needed, the application frees the cluster L3 cache space and notifies the master node to recycle the freed L3 cache space (operation 386). This notification can be a control message sent to the master node. If a free operation is not needed, the application determines that no memory cleanup is needed (operation 388).

Cluster Memory

Figure 4A:
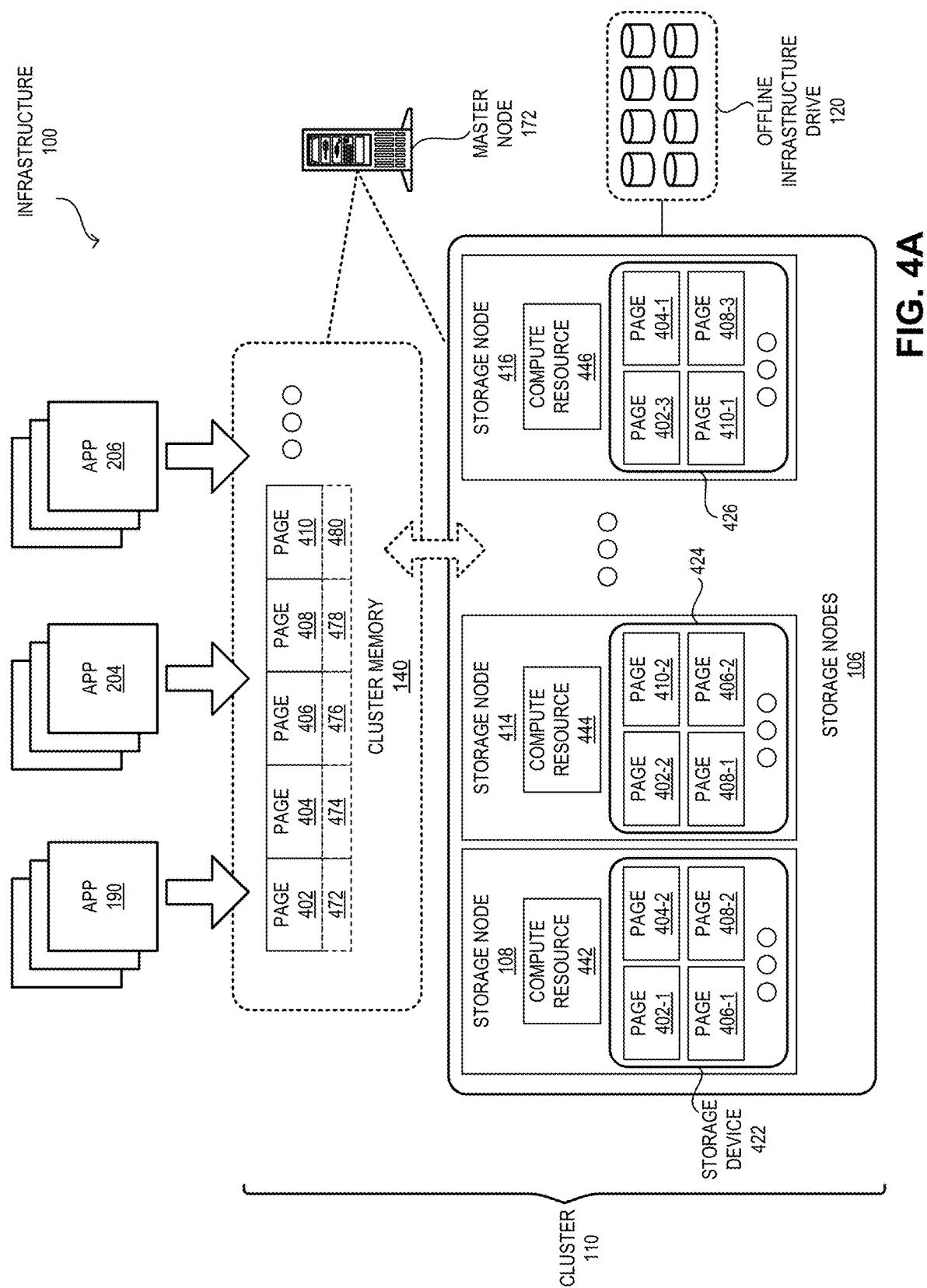
FIG. 4A illustrates exemplary memory pages in the cluster memory, in accordance with an embodiment of the present application.

FIG. 4A illustrates exemplary memory pages in the cluster memory, in accordance with an embodiment of the present application. Infrastructure 100 provides cluster memory 140 based on the storage devices of storage nodes 106. Cluster memory 140 can be considered as a byte-addressable contiguous virtual memory space. A respective page of cluster memory 140 can be addressed using a virtual address. A respective page stored in cluster memory 140 is stored and accessed based on the virtual address. Cluster memory 140 operates as a cluster-wide common memory space that applications 190, 204, and 206, which run on different compute nodes, can use. Suppose that cluster memory 140 stores a number of pages 402, 404, 406, 408, and 410 based on corresponding virtual addresses 472, 474, 476, 478, and 480, respectively. Application 190 can use virtual address 472 to store and retrieve the content of page 402.

However, the content of page 402 is physically stored in multiple storage devices of storage nodes 106. Application 190 can perceive only one copy of page 402 in cluster memory 140 even though master node 172 can store three replicas of page 402, which are 402-1, 402-2, and 402-3, in storage devices 422, 424, and 426 of storage nodes 108, 414, and 416, respectively. Master node 172 can maintain a mapping between virtual address 472 of page 402 and the respective physical address of page replicas 402-1, 402-2, and 402-3. One of page replicas 402-1, 402-2, and 402-3 is selected as the representative page replica, which can be the primary copy of page 402. For example, if page replica 402-1 is the representative page replica, page replica 402-1 is presented as page 402 in cluster memory 140. To retrieve the data in page 402, application 190 can issue a read operation based on virtual address 472. Master node 172 can retrieve the content of one of page replicas 402-1, 402-2, and 402-3 and provide the content to application 190.

In some embodiments, master node 172 can use a replica selection policy to determine which replica to retrieve the content from. The selection policy can be based on which storage node can provide the fastest retrieval. By maintaining page replicas 402-1, 402-2, and 402-3, master node 172 can provide high availability to page 402. Suppose that storage node 416 becomes unavailable (e.g., due a node or a network failure). As a result, page replicas 402-3, 404-1, 408-3, and 410-1 in storage device 416 can become inaccessible from master node 172. However, since other replicas of pages 402, 404, 408, and 410 are stored in storage devices 422 and 424 of storage nodes 108 and 414, respectively, master node 172 can still facilitate read and write operations on pages 402, 404, 408, and 410 in cluster memory 140.

A respective storage node in storage nodes 106 can also be equipped with compute resources, such as compute resources 442, 444, and 446 in storage nodes 108, 414, and 416, respectively. Compute resources 442, 444, and 446 can facilitate operations for the functioning of cluster memory 140 and cooperation with offline drive 120. When application 190 puts page 402 into cluster memory 140, a streamlining process is launched by the compute resource of the corresponding storage node. When page 402 is allocated for application 190, master node 172 determines which replica page represents the page in cluster memory 140. For example, page 402 in cluster memory 140 can be represented by page replica 402-1 on storage device 422. Similarly, page 404 in cluster memory 140 can be represented by page replica 404-1 on storage device 426.

When application 190 performs any read/write operation on page 402, compute resource 442 initiates the streamlining process so that only one physical page corresponding to page 402 is presented to application 190, even though there are multiple replicas of page 402 in storage nodes 106. Upon completion of the operation, compute resource 442 can obtain the locations of the other replicas (e.g., storage nodes 414 and 416). Compute resource 442 can then synchronize the data on page replica 402-1 with other page replicas 402-2 and 402-3, thereby ensuring the consistency of data. Since this streamlining process is done inline (i.e., during the execution of the operation), this streamlining ensures capacity saving with the reduced access overhead.

Compute resource 442 can also take periodic snapshots of storage device 422. In some embodiments, based on the streamlining process, compute resource 442 can determine which data blocks have been updated. Compute resource 442 then takes the snapshot of the updated data block and transfers that snapshot to offline drive 120. For example, if the data blocks comprising page replicas 402-1 and 406-1 have been updated since the previous snapshot but the data blocks comprising page replicas 404-2 and 408-2 have not, compute resource 442 can take a snapshot of the data blocks comprising page replicas 402-1 and 406-1, and transfers that snapshot to offline drive 120. It should be noted that the data blocks comprising page replicas 404-2 and 408-2 could have been backed up with a snapshot in one of the previous snapshots. In addition, information indicating how the data blocks are organized (e.g., the mapping between physical and virtual page addresses) are also periodically backed up to offline drive 120.

In some embodiments, once the data is backed up to offline drive 120, infrastructure 100 can maintain a single copy of each page in the storage nodes. In other words, the backed-up pages are no longer stored in the multiple replica format. This saves storage space on the storage nodes. Instead, a respective page is protected using erasure coding, which generally requires significantly less storage capacity. For example, after page 402 is backed up, infrastructure 100 may not maintain page replicas 402-2 and 402-3. Instead, page 402 can be divided into multiple coded fragments and stored in different storage nodes. Since page 402 in cluster memory 140 can be represented by page replica 402-1 on storage device 422, infrastructure 100 can still maintain page replica 402-1 to efficiently perform the read/write operations corresponding to page 402 on page replica 402-1. If page 402 is updated, the updated page replica 402-1 can be divided into multiple coded fragments and stored in different other storage nodes (e.g., storage nodes 414 and 416).

Figure 4B:
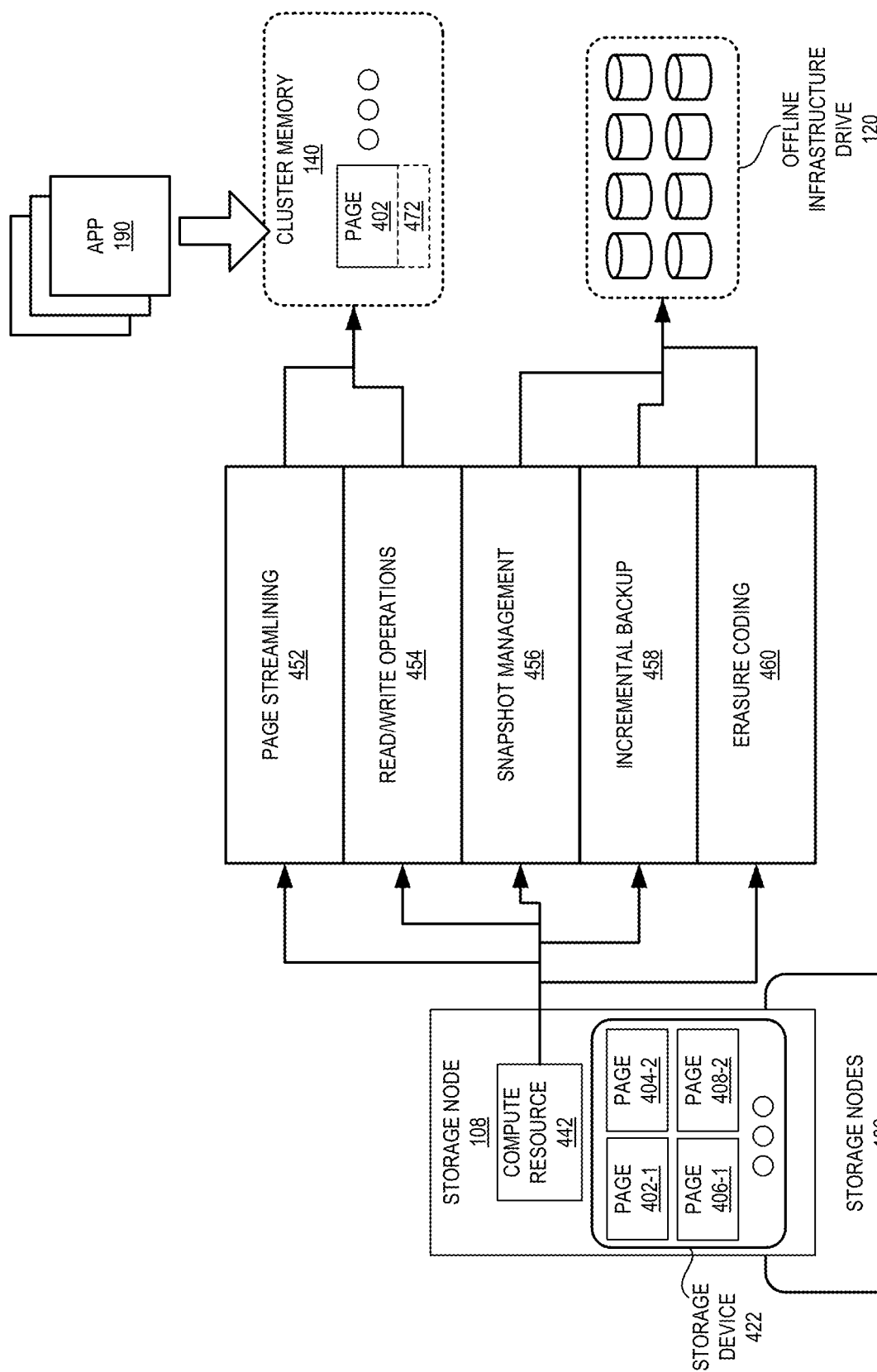
FIG. 4B illustrates an exemplary distribution of operations associated with the cluster memory, in accordance with an embodiment of the present application.

FIG. 4B illustrates an exemplary distribution of operations associated with the cluster memory, in accordance with an embodiment of the present application. In this example, compute resource 442 of storage node 108 can perform page streamlining process 452 on page 402 in cluster memory 140 by storing page replica 402-1 in the physical location corresponding to virtual address 472. In addition, compute resource 442 can also perform read/write operations 454 for page 402. As a result, application 190 can execute read/write operations 454 based on virtual address 472, and compute resource 442 can perform the corresponding operation on page replica 402-1.

Furthermore, compute resource 442 can facilitate snapshot management 456 by taking the periodic snapshot of storage device 422 and storing it on offline drive 120. To do so, compute resource 442 can perform incremental backup operation 458 by taking a snapshot of the data blocks of storage device 422 that have been updated since the last update, as described in conjunction with FIG. 4A. In addition, once a data block on compute resource 442 is backed up on offline drive 120, compute resource 442 can perform erasure coding 460 on that data block and store the coded fragments of the data blocks on other storage nodes, thereby saving storage space in storage nodes 106.

Operations of Cluster Memory

Figure 5A:
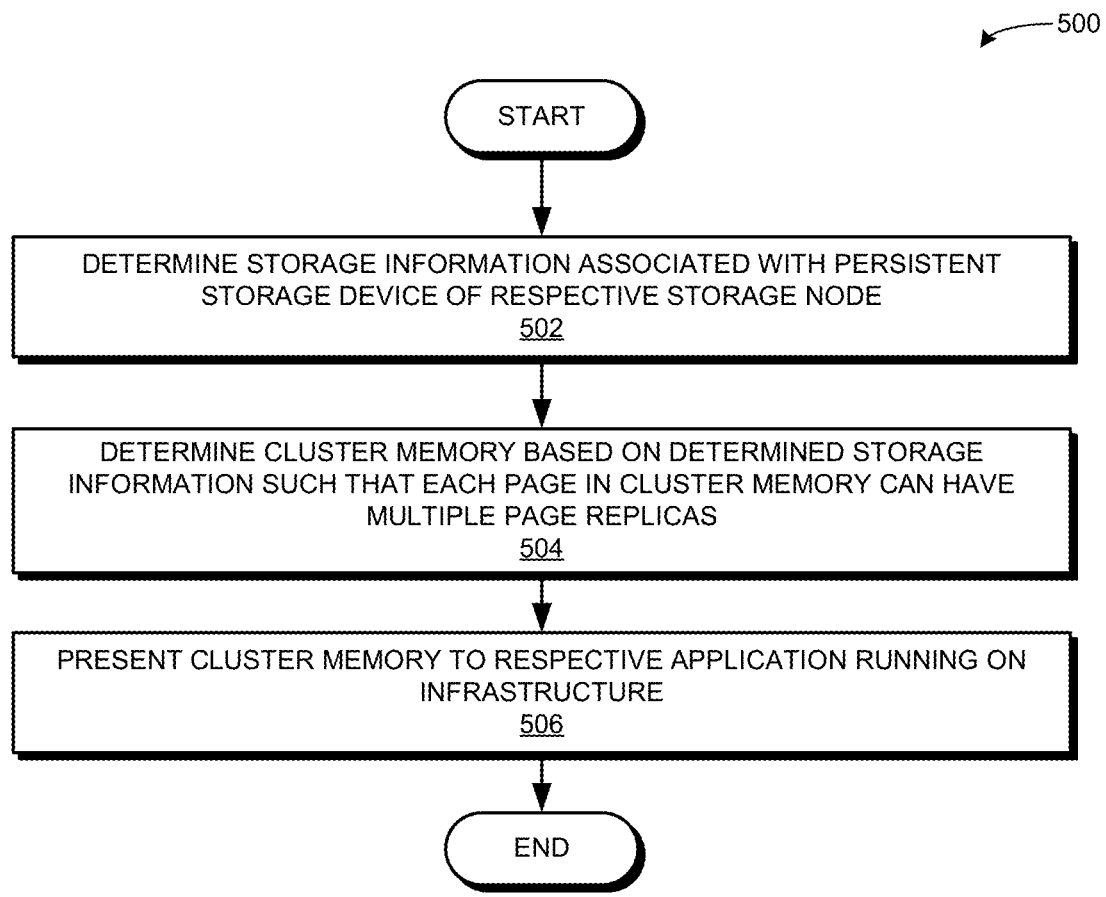
FIG. 5A presents a flowchart illustrating a method of the infrastructure forming the cluster memory, in accordance with an embodiment of the present application.

FIG. 5A presents a flowchart 500 illustrating a method of the infrastructure forming the cluster memory, in accordance with an embodiment of the present application. This method of the infrastructure can be carried out by one or more of: the compute resource of a storage node and the master node. During operation, the infrastructure determines storage information associated with the persistent storage device of a respective storage node (operation 502). The storage information can include one or more of: the available memory space (e.g., the size of the storage device), disk type, input/output (I/O) speed, bus width, and the data transfer rate for the storage device. The infrastructure then determines the cluster memory based on the determined storage information such that each page in the cluster memory can have multiple page replicas (operation 504). The infrastructure presents the cluster memory to a respective application running on the infrastructure (operation 506). The applications can perceive the cluster memory as a memory space for the representative page replicas. The other copies of the page replicas may not be presented in the cluster memory and hence, may remain "invisible" to the applications.

Figure 5B:
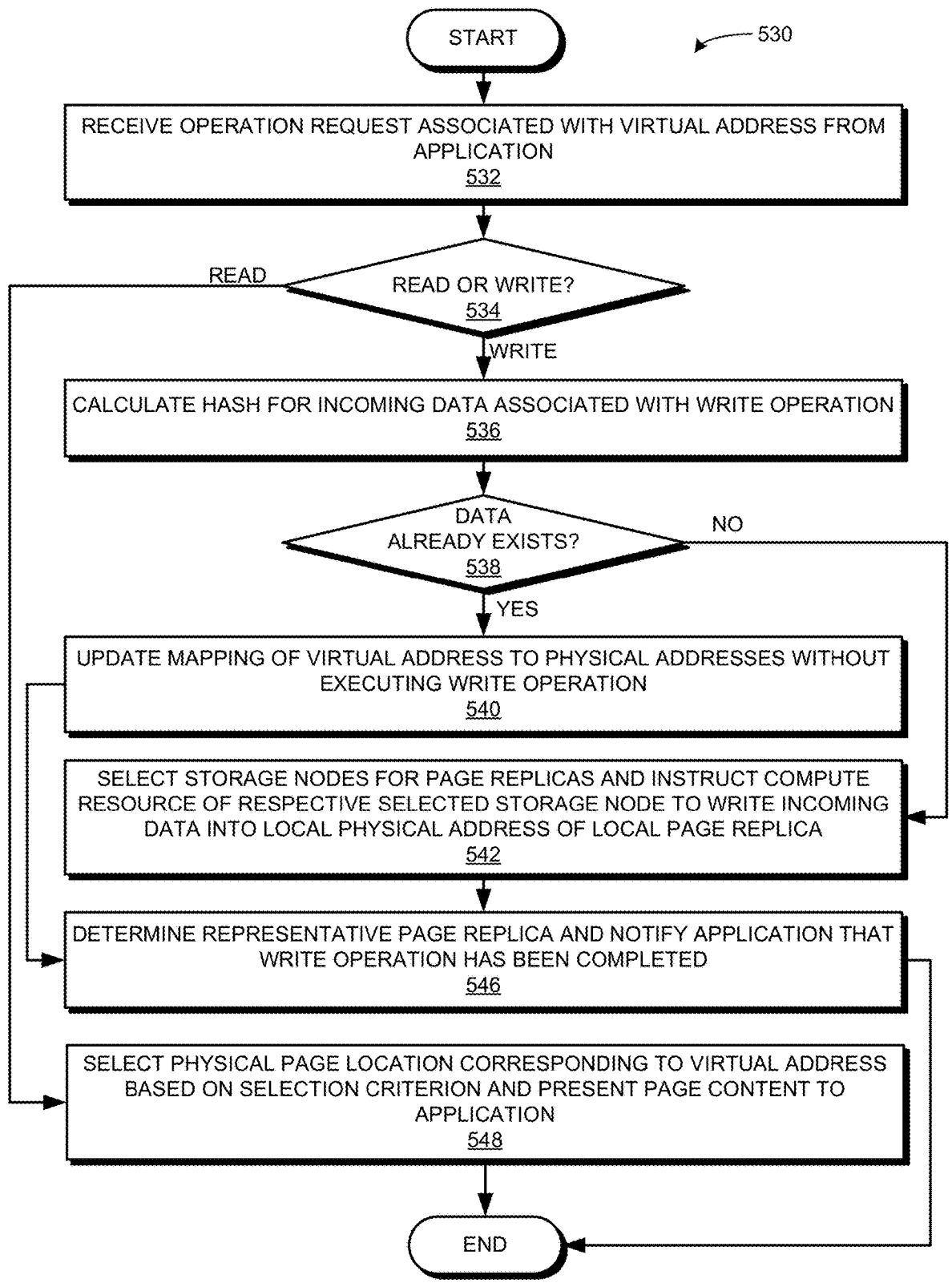
FIG. 5B presents a flowchart illustrating a method of the infrastructure performing a read/write operation on the cluster memory, in accordance with an embodiment of the present application.

FIG. 5B presents a flowchart 530 illustrating a method of the infrastructure performing a read/write operation on the cluster memory, in accordance with an embodiment of the present application. This method of the infrastructure can be carried out by one or more of: the compute resource of a storage node and the master node. During operation, the infrastructure receives an operation request associated with a virtual address from an application (operation 532) and determines whether the request is a read request or a write request (operation 534). If the request is a write request, the infrastructure can calculate a hash of the incoming data associated with the write request (operation 536) and checks whether the data already exists in the cluster memory based on the calculated hash (operation 538).

If the data already exists, the infrastructure updates the mapping of the virtual address to the physical addresses without executing the write operation (operation 540). On the other hand, if the data doesn't exist, the infrastructure selects storage nodes for the page replicas and instructs the compute resource of a respective selected storage node to write incoming data into the local physical address of the local page replica (operation 542). Upon updating the mapping (operation 540) or issuing the write instruction (operation 542), the infrastructure determines the representative page replica and notifies the application that the write operation has been completed (operation 546). The representative page replica is the primary copy of the page that is presented in the cluster memory. If the request is a read request, the infrastructure selects the physical page location corresponding to the virtual address based on a selection criterion and presents the page content to the application (operation 548). The selection criterion can indicate which page replica would be the fastest to retrieve.

Figure 5C:
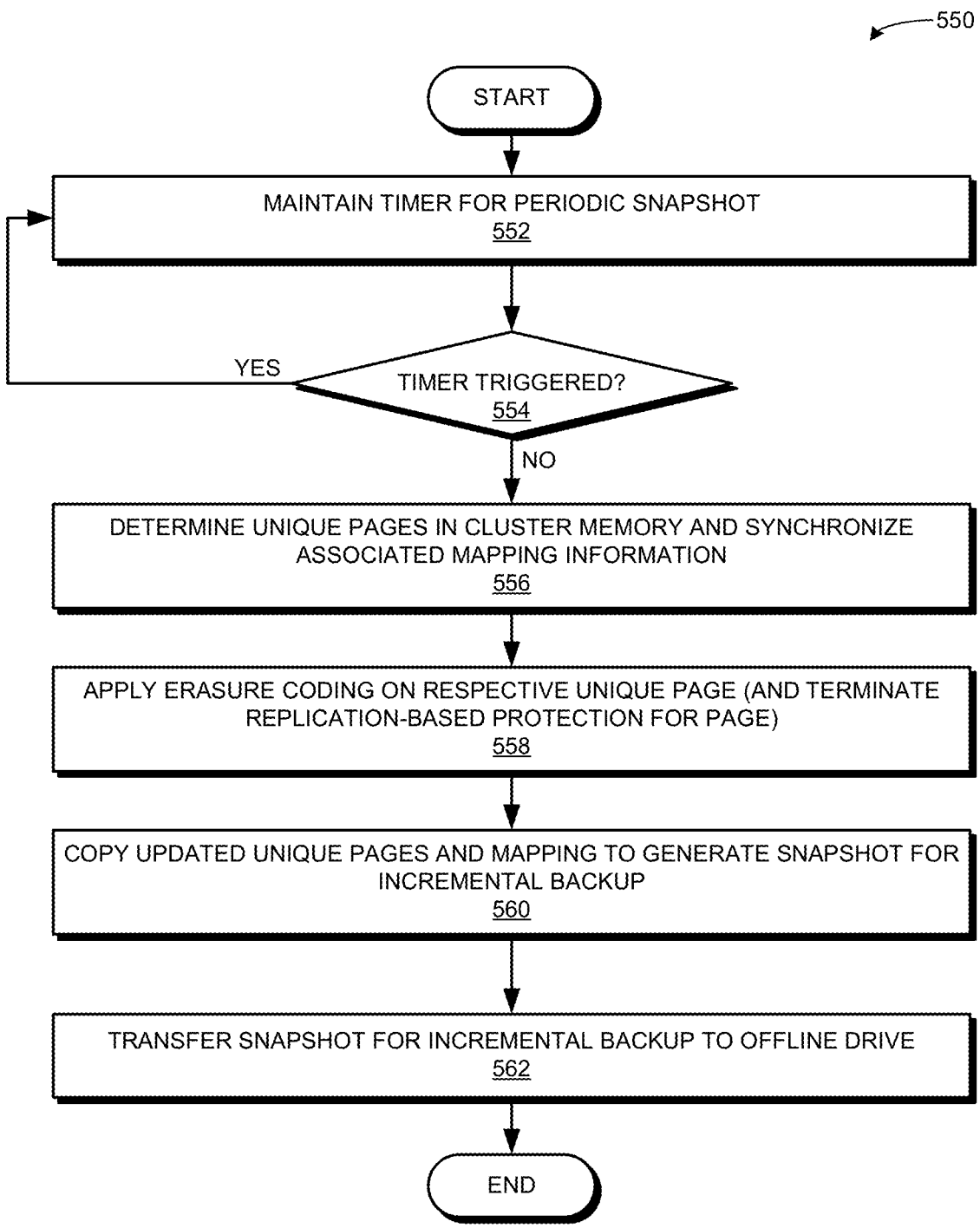
FIG. 5C presents a flowchart illustrating a method of the infrastructure performing an offline backup of the cluster memory, in accordance with an embodiment of the present application.

FIG. 5C presents a flowchart 550 illustrating a method of the infrastructure performing an offline backup of the cluster memory, in accordance with an embodiment of the present application. This method of the infrastructure can be carried out by one or more of: the compute resource of a storage node and the master node. During operation, the infrastructure maintains a timer for a periodic snapshot (operation 552) and checks whether the timer has been triggered (operation 554). If the timer has not been triggered, the infrastructure can continue to maintain the timer for the periodic snapshot (operation 552). If the timer is triggered, the infrastructure determines the unique pages in the cluster memory and synchronizes the associated mapping information (operation 556).

The infrastructure can determine the representative pages as the unique pages (i.e., the unique copies of each page). The infrastructure then applies erasure coding to a respective unique page (operation 558). In some embodiments, the infrastructure can terminate the replication-based protection for the unique pages. The infrastructure then copies the updated unique pages and mapping (i.e., the ones that have been updated since the last snapshot) to generate the snapshot for the incremental backup (operation 560) and transfers the snapshot for the incremental back to the offline drive (operation 562).

Exemplary Computer System and Apparatus

Figure 6:
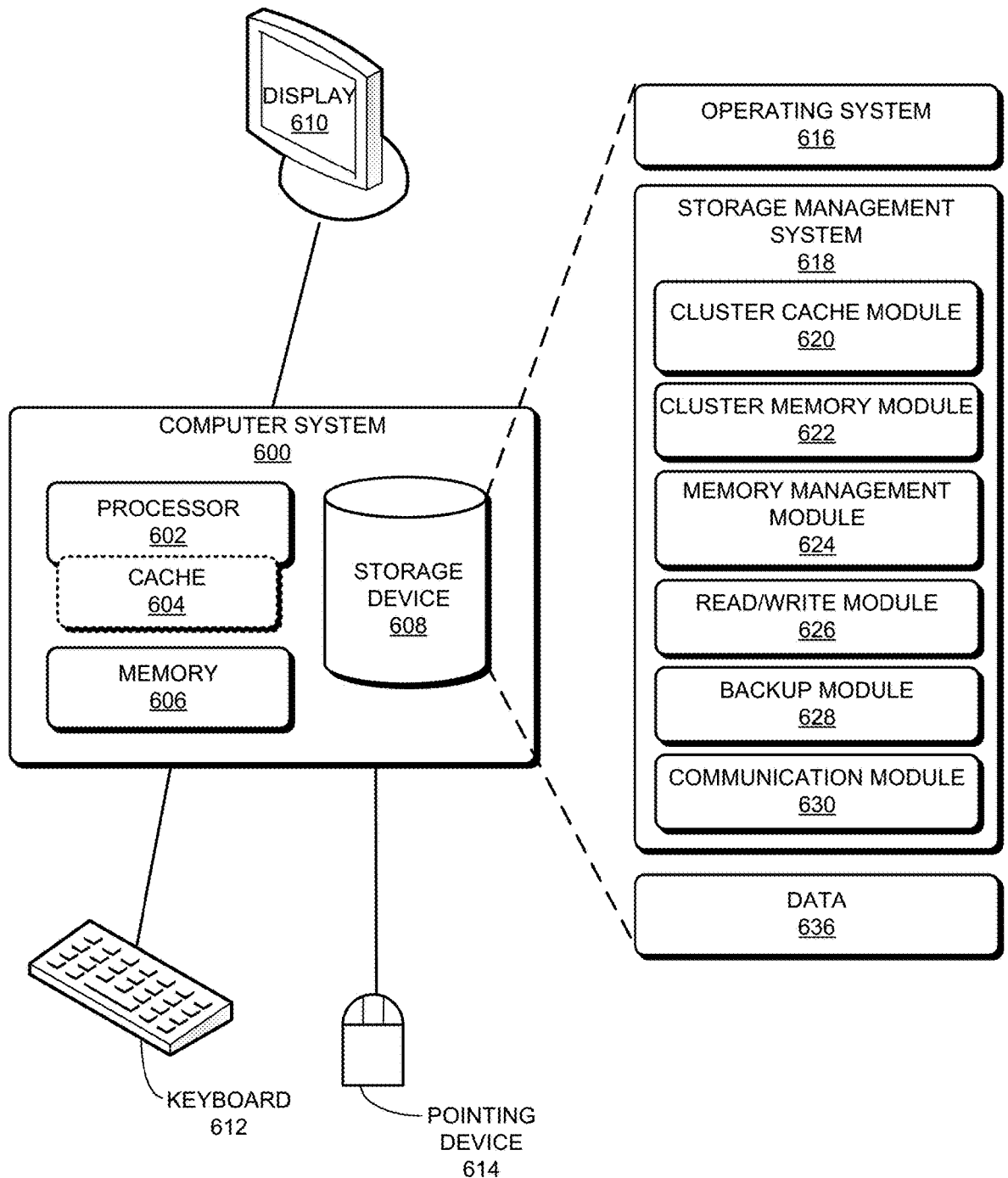
FIG. 6 illustrates an exemplary computer system that facilitates provision of cluster-level cache and memory to applications, in accordance with an embodiment of the present application.

FIG. 6 illustrates an exemplary computer system that facilitates provision of cluster-level cache and memory to applications, in accordance with an embodiment of the present application. Computer system 600 includes a processor 602, cache 604 of processor 602, a memory 606, and a storage device 608. Memory 606 can include a volatile memory (e.g., a dual in-line memory module (DIMM)). Furthermore, computer system 600 can be coupled to a display device 610, a keyboard 612, and a pointing device 614. Storage device 608 can store an operating system 616, a storage management system 618, and data 636. Storage management system 618 can facilitate the operations of one or more of: a compute node, a master node, a storage node (e.g., the computing resource on the storage node), and an offline storage device.

Storage management system 618 can include instructions, which when executed by computer system 600 can cause computer system 600 to perform methods and/or processes described in this disclosure. Specifically, storage management system 618 can include instructions for presenting the L1/L2/L3 cache of a respective compute node's CPU as cluster L1 cache, the memory of a respective compute node as the cluster L2 cache, and the persistent storage device of a respective compute node as the cluster L3 cache (cluster cache module 620). Furthermore, storage management system 618 includes instructions for presenting the persistent storage devices of a respective storage node as a cluster memory (cluster memory module 622). Moreover, storage management system 618 includes instructions for presenting unique pages in the cluster memory while maintaining multiple page replicas in multiple storage nodes (memory management module 624).

Storage management system 618 further includes instructions for maintaining mappings between virtual and physical addresses for the cluster L3 cache and/or the cluster memory (memory management module 624). Storage management system 618 can also include instructions that allow applications to access (e.g., read from and write to) the cluster L1/L2/L3 cache and/or the cluster memory (read/write module 626). In addition, storage management system 618 includes instructions for periodically backing up the snapshots of unique pages to an offline drive (backup module 628). Storage management system 618 can also include instructions for facilitating erasure-coding-based protection to the pages that have been backed up (backup module 628). Storage management system 618 may further include instructions for sending and receiving messages (communication module 630). Data 636 can include any data that can facilitate the operations of infrastructure 100.

Figure 7:
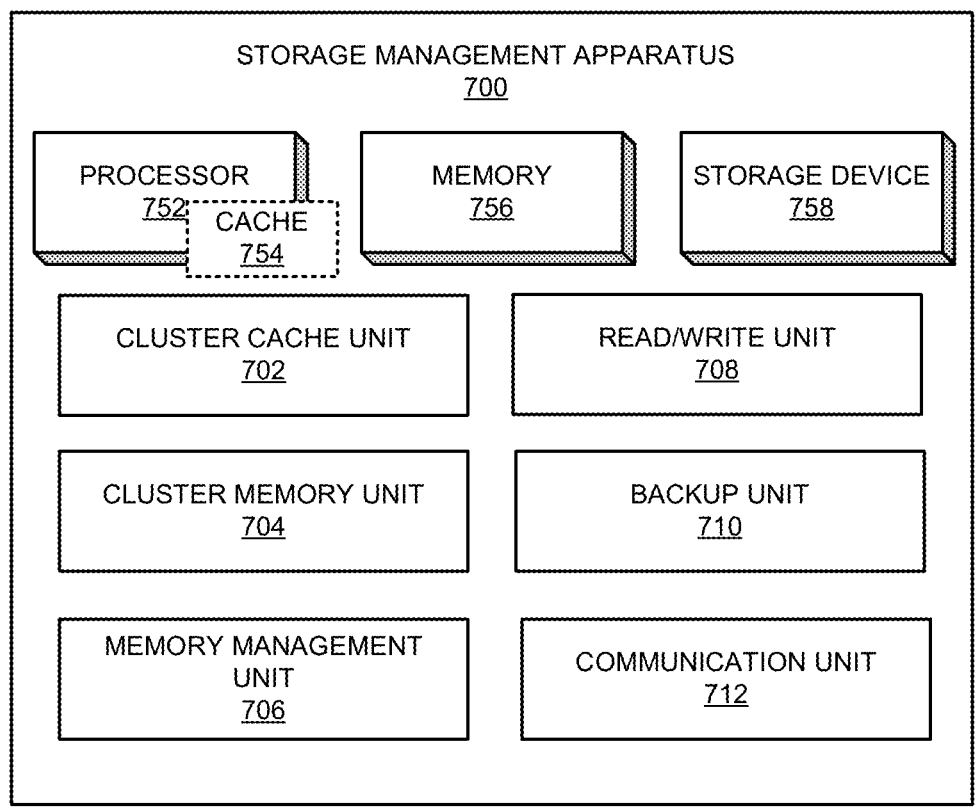
FIG. 7 illustrates an exemplary apparatus that facilitates provision of cluster-level cache and memory to applications, in accordance with an embodiment of the present application.

FIG. 7 illustrates an exemplary apparatus that facilitates provision of cluster-level cache and memory to applications, in accordance with an embodiment of the present application. Storage management apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can include processor 752, cache 754, memory 756, and storage device 758. Apparatus 700 can further comprise units 702-712, which perform functions or operations similar to modules 620-630 of computer system 600 of FIG. 6, including: a cluster cache unit 702; cluster memory unit 704; a memory management unit 706; a read/write unit 708; a backup unit 710; and a communication unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating cluster-level cache and memory in a cluster, the method comprising:

presenting a cluster cache and a cluster memory to a first application running on a first compute node in the cluster, wherein the cluster cache operates as a cache for a respective node in the cluster and is formed based on persistent storages of one or more compute nodes in the cluster, and wherein the cluster memory operates as a memory for a respective node in the cluster and is formed based on persistent storages of one or more storage nodes in the cluster;

maintaining a first mapping between a first virtual address of the cluster cache and a first physical address of a first persistent storage of the first compute node of the one or more compute nodes; and in response to a first memory allocation request for cache memory from the first application, allocating a first memory location corresponding to the first physical address based on the first mapping, wherein the first application is configured to access the first memory location based on the first virtual address.

2. The method of claim 1, further comprising:

determining whether a second memory allocation request from the first application can be served from the first persistent storage; and in response to determining that the second memory allocation request cannot be served from the first persistent storage, allocating a second memory location corresponding to a third physical address of a third persistent storage of a second compute node of the one or more compute nodes, wherein the third physical address is mapped to a third virtual address, and wherein the first application is configured to access the second memory location based on the third virtual address.

3. The method of claim 1, further comprising, in response to a first free request from the first application based on the first virtual address, making the first memory location available for subsequent allocation.

4. The method of claim 1, further comprising:
maintaining a second mapping between a second virtual address of the cluster memory and a second physical address of a second persistent storage of a first storage node of the one or more storage nodes; and
storing a data page of the first application in a second memory location corresponding to the second physical address based on the second mapping, wherein the first application is configured to access the second memory location based on the second virtual address.

5. The method of claim 4, further comprising storing a replica of the data page at a third memory location corresponding to a third physical address of a fourth persistent storage of a second storage node of the one or more storage nodes, wherein the second virtual address is further mapped to the third physical address.

6. The method of claim 5, further comprising:
receiving a read request for the data page based on the second virtual address;
selecting between the second and a third persistent storages for retrieving the data page to serve the read request; and
obtaining the data page from the selected persistent storage.

7. The method of claim 4, further comprising:
receiving a write request for a data page from the first application based on the second virtual address;
determining that the data page already exists based on the second mapping; and
updating the second mapping without executing a write operation.

8. The method of claim 1, further comprising:
receiving a write request for a data page from the first application;
storing the data page at memory locations of a plurality of physical addresses;
mapping a third virtual address to the plurality of physical addresses; and
selecting one of the plurality of physical addresses as a representative address of the data page for presenting the cluster memory.

9. The method of claim 1, further comprising:
determining unique data pages of the cluster memory;
generating a backup file comprising the unique data pages and corresponding mapping information; and
sending the backup file to an offline drive distinct from the one or more storage nodes.

10. The method of claim 9, further comprising:
applying erasure coding to the unique data pages; and
terminating replication-based protection for the unique data pages.

11. A non-transitory computer-readable storage medium storing instructions that when executed by a computer cause the computer to perform a method for facilitating cluster-level cache and memory in a cluster, the method comprising:
presenting a cluster cache and a cluster memory to a first application running on a first compute node in the cluster, wherein the cluster cache operates as a cache for a respective node in the cluster and is formed based on persistent storages of one or more compute nodes in the cluster, and wherein the cluster memory operates as a memory for a respective node in the cluster and is formed based on persistent storages of one or more storage nodes in the cluster;
maintaining a first mapping between a first virtual address of the cluster cache and a first physical address of a first persistent storage of the first compute node of the one or more compute nodes; and
in response to a first memory allocation request for cache memory from the first application, allocating a first memory location corresponding to the first physical address based on the first mapping, wherein the first application is configured to access the first memory location based on the first virtual address.

12. The computer-readable storage medium of claim 11, wherein the method further comprises:
determining whether a second memory allocation request from the first application can be served from the first persistent storage;
in response to determining that the second memory allocation request cannot be served from the first persistent storage, allocating a second memory location corresponding to a third physical address of a third persistent storage of a second compute node of the one or more compute nodes, wherein the third physical address is mapped to a third virtual address, and wherein the first application is configured to access the second memory location based on the third virtual address.

13. The computer-readable storage medium of claim 11, wherein the method further comprises, in response to a first free request from the first application based on the first virtual address, making the first memory location available for subsequent allocation.

14. The computer-readable storage medium of claim 11, wherein the method further comprises:
maintaining a second mapping between a second virtual address of the cluster memory and a second physical address of a second persistent storage of a first storage node of the one or more storage nodes; and
storing a data page of the first application in a second memory location corresponding to the second physical address based on the second mapping, wherein the first application is configured to access the second memory location based on the second virtual address.

15. The computer-readable storage medium of claim 14, wherein the method further comprises storing a replica of the data page at a third memory location corresponding to a third physical address of a fourth persistent storage of a second storage node of the one or more storage nodes, wherein the second virtual address is further mapped to the third physical address.

16. The computer-readable storage medium of claim 15, wherein the method further comprises:
receiving a read request for the data page based on the second virtual address;
selecting between the second and a third persistent storages for retrieving the data page to serve the read request; and
obtaining the data page from the selected persistent storage.

17. The computer-readable storage medium of claim 14, wherein the method further comprises:
receiving a write request for a data page from the first application based on the second virtual address;
determining that the data page already exists based on the second mapping; and
updating the second mapping without executing a write operation.

18. The computer-readable storage medium of claim 11, wherein the method further comprises:
- receiving a write request for a data page from the first application;
- storing the data page at memory locations of a plurality of physical addresses;
- mapping a third virtual address to the plurality of physical addresses; and
- selecting one of the plurality of physical addresses as a representative address of the data page for presenting the cluster memory.

19. The computer-readable storage medium of claim 11, wherein the method further comprises:
- determining unique data pages of the cluster memory;
- generating a backup file comprising the unique data pages and corresponding mapping information; and
- sending the backup file to an offline drive distinct from the one or more storage nodes.

20. The computer-readable storage medium of claim 19, wherein the method further comprises:
- applying erasure coding to the unique data pages; and
- terminating replication-based protection for the unique data pages.

* * * * *